US008285226B2

(12) United States Patent
Lundby et al.

(10) Patent No.: US 8,285,226 B2
(45) Date of Patent: Oct. 9, 2012

(54) STEERING DIVERSITY FOR AN OFDM-BASED MULTI-ANTENNA COMMUNICATION SYSTEM

(75) Inventors: Stein A. Lundby, Solana Beach, CA (US); Steven J. Howard, Ashland, MA (US); Jay Rodney Walton, Carlisle, MA (US)

(73) Assignee: Qualcomm Incorporated, San Diego, CA (US)

( * ) Notice: Subject to any disclaimer, the term of this patent is extended or adjusted under 35 U.S.C. 154(b) by 864 days.

(21) Appl. No.: 11/066,771

(22) Filed: Feb. 24, 2005

(65) Prior Publication Data

US 2005/0249174 A1      Nov. 10, 2005

Related U.S. Application Data

(60) Provisional application No. 60/569,103, filed on May 7, 2004.

(51) Int. Cl.
*H03C 7/02* (2006.01)
*H04B 1/02* (2006.01)
*H04B 7/02* (2006.01)

(52) U.S. Cl. ................ 455/101; 455/129; 375/260
(58) Field of Classification Search .............. 455/103, 455/104, 105, 110–113; 375/260, 267, 299
See application file for complete search history.

(56) References Cited

U.S. PATENT DOCUMENTS

| 5,581,583 | A | 12/1996 | Contii et al. |
| 5,668,837 | A | 9/1997 | Dentt et al. |
| 5,757,845 | A | 5/1998 | Fukawa et al. |
| 6,061,023 | A | 5/2000 | Daniel et al. |
| 6,144,711 | A * | 11/2000 | Raleigh et al. ............... 375/347 |
| 6,175,743 | B1 | 1/2001 | Alperovich et al. |
| 6,198,775 | B1 | 3/2001 | Khayrallah et al. |
| 6,218,985 | B1 | 4/2001 | Adams |
| 6,298,035 | B1 * | 10/2001 | Heiskala ..................... 370/206 |

(Continued)

FOREIGN PATENT DOCUMENTS

CA         2490520 A1    12/2003

(Continued)

OTHER PUBLICATIONS

Alamouti, "A Simple Transmit Diversity Technique for Wireless Communications," IEEE Journal on Select Areas in Communications, vol. 16, No, 8, Oct. 1998, pp. 1451-1458.

(Continued)

*Primary Examiner* — Christian Hannon
(74) *Attorney, Agent, or Firm* — Qualcomm Patent Group; Thien Nguyen; James Hunt Yancey, Jr.

(57) ABSTRACT

A transmitting entity uses different steering vectors for different subbands to achieve steering diversity. Each steering vector defines or forms a beam for an associated subband. Any steering vector may be used for steering diversity. The steering vectors may be defined such that the beams vary in a continuous instead of abrupt manner across the subbands. This may be achieved by applying continuously changing phase shifts across the subbands for each transmit antenna. As an example, the phase shifts may change in a linear manner across the subbands for each transmit antenna, and each antenna may be associated with a different phase slope. The application of linearly changing phase shifts to modulation symbols in the frequency domain may be achieved by either delaying or circularly shifting the corresponding time-domain samples.

30 Claims, 11 Drawing Sheets

U.S. PATENT DOCUMENTS

| | | | |
|---|---|---|---|
| 6,314,147 B1 | 11/2001 | Liang et al. | |
| 6,351,499 B1 | 2/2002 | Paulraj et al. | |
| 6,441,786 B1 | 8/2002 | Jasper et al. | |
| 6,452,981 B1 | 9/2002 | Raleigh et al. | |
| 6,473,467 B1 | 10/2002 | Wallace et al. | |
| 6,477,161 B1 | 11/2002 | Hudson et al. | |
| 6,486,828 B1 | 11/2002 | Cahn et al. | |
| 6,496,535 B2* | 12/2002 | Xu | 375/219 |
| 6,542,556 B1 | 4/2003 | Kuchi et al. | |
| 6,618,454 B1 | 9/2003 | Agrawal et al. | |
| 6,642,888 B2 | 11/2003 | Kishigamii et al. | |
| 6,678,263 B1 | 1/2004 | Hammons, Jr. et al. | |
| 6,711,124 B2 | 3/2004 | Khayrallah et al. | |
| 6,711,528 B2 | 3/2004 | Dishman et al. | |
| 6,760,388 B2 | 7/2004 | Ketchum et al. | |
| 6,763,073 B2 | 7/2004 | Foschini et al. | |
| 6,788,661 B1 | 9/2004 | Ylitalo et al. | |
| 6,801,790 B2 | 10/2004 | Rudrapatna | |
| 6,804,307 B1 | 10/2004 | Popovic | |
| 6,810,506 B1 | 10/2004 | Levy | |
| 6,816,555 B2* | 11/2004 | Sakoda | 375/260 |
| 6,842,487 B1 | 1/2005 | Larsson | |
| 6,847,306 B2 | 1/2005 | Diba et al. | |
| 6,859,747 B2 | 2/2005 | Yutkowitz | |
| 6,862,271 B2 | 3/2005 | Medvedev et al. | |
| 6,937,189 B2 | 8/2005 | Kim | |
| 6,940,917 B2 | 9/2005 | Menon et al. | |
| 6,956,897 B1 | 10/2005 | Honig | |
| 6,975,668 B2 | 12/2005 | Zhang | |
| 6,982,946 B2 | 1/2006 | Wiberg et al. | |
| 6,999,472 B2 | 2/2006 | Hamalainen et al. | |
| 7,020,110 B2 | 3/2006 | Walton et al. | |
| 7,020,490 B2 | 3/2006 | Khatri | |
| 7,031,669 B2 | 4/2006 | Vaidyanathan et al. | |
| 7,057,555 B2 | 6/2006 | Lewis | |
| 7,061,969 B2 | 6/2006 | Alamouti et al. | |
| 7,065,144 B2 | 6/2006 | Walton et al. | |
| 7,065,156 B1* | 6/2006 | Kuchi | 375/299 |
| 7,079,870 B2 | 7/2006 | Vaidyanathan | |
| 7,092,737 B2 | 8/2006 | Horng et al. | |
| 7,095,709 B2 | 8/2006 | Walton et al. | |
| 7,095,987 B2 | 8/2006 | Brothers, Jr. et al. | |
| 7,099,678 B2 | 8/2006 | Vaidyanathan | |
| 7,099,698 B2 | 8/2006 | Tarokh et al. | |
| 7,110,350 B2 | 9/2006 | Li et al. | |
| 7,110,378 B2 | 9/2006 | Onggosanusi et al. | |
| 7,110,463 B2 | 9/2006 | Wallace et al. | |
| 7,130,580 B2 | 10/2006 | Alexiou et al. | |
| 7,149,254 B2 | 12/2006 | Sampath | |
| 7,151,809 B2 | 12/2006 | Ketchum et al. | |
| 7,190,734 B2 | 3/2007 | Giannakis et al. | |
| 7,194,042 B2 | 3/2007 | Walton et al. | |
| 7,200,631 B2 | 4/2007 | Mailaender et al. | |
| 7,227,906 B2 | 6/2007 | Fukuda et al. | |
| 7,292,623 B2 | 11/2007 | Reznik | |
| 7,298,805 B2 | 11/2007 | Walton et al. | |
| 7,301,924 B1 | 11/2007 | Gurbuz et al. | |
| 7,302,009 B2 | 11/2007 | Walton et al. | |
| 7,317,750 B2 | 1/2008 | Shattil | |
| 7,324,429 B2 | 1/2008 | Walton et al. | |
| 7,324,482 B2 | 1/2008 | Hammons, Jr. et al. | |
| 7,327,795 B2 | 2/2008 | Oprea | |
| 7,327,798 B2 | 2/2008 | Won | |
| 7,327,800 B2 | 2/2008 | Oprea et al. | |
| 7,336,746 B2 | 2/2008 | Walton et al. | |
| 7,356,073 B2 | 4/2008 | Heikkila | |
| 7,359,466 B2 | 4/2008 | Huang et al. | |
| 7,385,617 B2* | 6/2008 | Tahat | 347/147 |
| 7,394,754 B2 | 7/2008 | Lii et al. | |
| 7,436,896 B2 | 10/2008 | Hottinen et al. | |
| 7,447,268 B2 | 11/2008 | Sadowskyy et al. | |
| 7,529,177 B2* | 5/2009 | Celebi et al. | 370/208 |
| 7,539,253 B2 | 5/2009 | Li et al. | |
| 7,555,053 B2 | 6/2009 | Trachewsky et al. | |
| 7,583,747 B1 | 9/2009 | Damen et al. | |
| 7,593,317 B2 | 9/2009 | Yudaa et al. | |
| 7,787,554 B1 | 8/2010 | Nabar et al. | |
| 2001/0053124 A1 | 12/2001 | Ichihara et al. | |
| 2002/0009125 A1 | 1/2002 | Shi | |
| 2002/0102940 A1 | 8/2002 | Bohnke et al. | |
| 2002/0114269 A1 | 8/2002 | Onggosanusi et al. | |
| 2002/0127978 A1 | 9/2002 | Khatri et al. | |
| 2002/0172264 A1 | 11/2002 | Wiberg et al. | |
| 2002/0193146 A1 | 12/2002 | Wallace et al. | |
| 2002/0196742 A1 | 12/2002 | Baker et al. | |
| 2003/0011274 A1 | 1/2003 | Saint-Michel et al. | |
| 2003/0016637 A1 | 1/2003 | Khayrallah et al. | |
| 2003/0026349 A1 | 2/2003 | Onggosanusi et al. | |
| 2003/0072254 A1 | 4/2003 | Ma et al. | |
| 2003/0076908 A1 | 4/2003 | Huang et al. | |
| 2003/0108117 A1 | 6/2003 | Ketchum et al. | |
| 2003/0112745 A1 | 6/2003 | Zhuang et al. | |
| 2003/0123565 A1 | 7/2003 | Fukuda et al. | |
| 2003/0123567 A1 | 7/2003 | Shigemasa et al. | |
| 2003/0128658 A1 | 7/2003 | Walton et al. | |
| 2003/0161282 A1 | 8/2003 | Medvedev et al. | |
| 2003/0181211 A1 | 9/2003 | Razavilar et al. | |
| 2003/0186698 A1 | 10/2003 | Holma et al. | |
| 2003/0189999 A1 | 10/2003 | Kadous | |
| 2003/0204380 A1 | 10/2003 | Dishman et al. | |
| 2003/0228850 A1 | 12/2003 | Hwang | |
| 2003/0235147 A1 | 12/2003 | Walton et al. | |
| 2003/0235255 A1 | 12/2003 | Ketchum et al. | |
| 2004/0002364 A1 | 1/2004 | Trikkonen et al. | |
| 2004/0022183 A1* | 2/2004 | Li et al. | 370/210 |
| 2004/0042439 A1 | 3/2004 | Menon et al. | |
| 2004/0052315 A1 | 3/2004 | Thielecke et al. | |
| 2004/0081263 A1 | 4/2004 | Lee et al. | |
| 2004/0082356 A1 | 4/2004 | Walton et al. | |
| 2004/0085939 A1 | 5/2004 | Wallace et al. | |
| 2004/0086027 A1 | 5/2004 | Shattil et al. | |
| 2004/0102157 A1 | 5/2004 | Lewis et al. | |
| 2004/0136349 A1 | 7/2004 | Walton et al. | |
| 2004/0139137 A1 | 7/2004 | Mailaender et al. | |
| 2004/0165675 A1 | 8/2004 | Ito et al. | |
| 2004/0190639 A1 | 9/2004 | Pauli et al. | |
| 2004/0203473 A1 | 10/2004 | Liu | |
| 2004/0248604 A1 | 12/2004 | Vaidyanathan et al. | |
| 2005/0017511 A1 | 1/2005 | Dalton | |
| 2005/0026570 A1 | 2/2005 | Han et al. | |
| 2005/0149320 A1 | 7/2005 | Kajala et al. | |
| 2005/0175115 A1 | 8/2005 | Walton et al. | |
| 2005/0180312 A1 | 8/2005 | Walton et al. | |
| 2005/0195733 A1 | 9/2005 | Walton et al. | |
| 2005/0220199 A1* | 10/2005 | Sadowsky et al. | 375/260 |
| 2005/0238111 A1 | 10/2005 | Wallace et al. | |
| 2005/0249159 A1 | 11/2005 | Abraham et al. | |
| 2005/0265275 A1 | 12/2005 | Howard et al. | |
| 2005/0267925 A1 | 12/2005 | Clue | |
| 2005/0276347 A1 | 12/2005 | Mujtaba et al. | |
| 2006/0013250 A1 | 1/2006 | Howard et al. | |
| 2006/0050770 A1 | 3/2006 | Wallace et al. | |
| 2006/0067277 A1 | 3/2006 | Thomas et al. | |
| 2006/0067421 A1 | 3/2006 | Walton et al. | |
| 2006/0068718 A1 | 3/2006 | Li et al. | |
| 2006/0106902 A1 | 5/2006 | Howard et al. | |
| 2006/0155798 A1 | 7/2006 | Ketchum et al. | |
| 2006/0234789 A1 | 10/2006 | Tarokh et al. | |
| 2006/0274844 A1 | 12/2006 | Walton et al. | |
| 2006/0285531 A1 | 12/2006 | Howard et al. | |
| 2007/0009059 A1 | 1/2007 | Wallace et al. | |
| 2007/0217538 A1 | 9/2007 | Waxman | |
| 2007/0249296 A1 | 10/2007 | Howard et al. | |
| 2008/0031372 A1 | 2/2008 | Walton et al. | |
| 2008/0031374 A1 | 2/2008 | Walton et al. | |
| 2008/0095282 A1 | 4/2008 | Walton et al. | |
| 2008/0273617 A1 | 11/2008 | Lundbyy et al. | |

FOREIGN PATENT DOCUMENTS

| | | |
|---|---|---|
| CA | 2510840 A1 | 7/2004 |
| CN | 1476695 A | 2/2004 |
| CN | 1592144 A | 3/2005 |
| EP | 0091999 A2 | 10/1983 |
| EP | 0752793 A2 | 1/1997 |
| EP | 0905920 A2 | 3/1999 |
| EP | 1009124 A2 | 6/2000 |
| EP | 1073214 A1 | 1/2001 |

| | | |
|---|---|---|
| EP | 1185001 | 3/2002 |
| EP | 1220506 | 7/2002 |
| EP | 1223702 A1 | 7/2002 |
| EP | 1241824 | 9/2002 |
| EP | 1353452 A2 | 10/2003 |
| EP | 1361686 | 11/2003 |
| EP | 1396956 | 3/2004 |
| JP | 11205026 A | 7/1999 |
| JP | 2002503048 T | 1/2002 |
| JP | 2002524972 | 8/2002 |
| JP | 2003530010 | 10/2003 |
| JP | 2004023416 | 1/2004 |
| JP | 2004064654 A | 2/2004 |
| JP | 2004072150 A | 3/2004 |
| JP | 2004096753 A | 3/2004 |
| JP | 2004104790 A | 4/2004 |
| JP | 2005524331 T | 8/2005 |
| JP | 2007515131 | 6/2007 |
| JP | 2007515829 T | 6/2007 |
| JP | 2007523549 T | 8/2007 |
| JP | 2007523550 T | 8/2007 |
| JP | 2007527150 | 9/2007 |
| JP | 2007529972 T | 10/2007 |
| JP | 2007538414 T | 12/2007 |
| KR | 200260860 | 7/2002 |
| KR | 20040061023 A | 7/2004 |
| KR | 20040089748 | 10/2004 |
| KR | 20060123496 | 12/2006 |
| RU | 2111619 | 5/1998 |
| RU | 2116698 | 7/1998 |
| RU | 2202152 | 4/2003 |
| RU | 2238611 C1 | 10/2004 |
| RU | 2003135853 | 4/2005 |
| RU | 2005115862 | 1/2006 |
| TW | 508960 | 11/2002 |
| TW | 510103 B | 11/2002 |
| TW | 512602 | 12/2002 |
| WO | 9737456 | 10/1997 |
| WO | WO0156218 A1 | 2/2001 |
| WO | 0176110 | 10/2001 |
| WO | WO0225857 A1 | 3/2002 |
| WO | 02078211 | 10/2002 |
| WO | WO02093784 A1 | 11/2002 |
| WO | 03015334 | 2/2003 |
| WO | 03041300 | 5/2003 |
| WO | WO03050968 | 6/2003 |
| WO | 03058871 | 7/2003 |
| WO | WO03056742 A1 | 7/2003 |
| WO | WO03063526 A1 | 7/2003 |
| WO | WO03071711 | 8/2003 |
| WO | WO03094386 A1 | 11/2003 |
| WO | 2004002011 | 12/2003 |
| WO | 2004002047 | 12/2003 |
| WO | WO03101029 A1 | 12/2003 |
| WO | WO2004021605 A1 | 3/2004 |
| WO | 2004038984 | 5/2004 |
| WO | 2004038985 | 5/2004 |
| WO | WO2004038987 | 5/2004 |
| WO | WO2004039011 | 5/2004 |
| WO | WO2004043082 A2 | 5/2004 |
| WO | WO2004054191 | 6/2004 |
| WO | WO2005060144 | 6/2005 |
| WO | WO2005060192 A1 | 6/2005 |
| WO | WO2005088882 A1 | 9/2005 |
| WO | WO2005099211 A1 | 10/2005 |
| WO | WO2005114868 | 12/2005 |
| WO | WO2006053340 A2 | 5/2006 |

OTHER PUBLICATIONS

Dammann, et al., "Beamforming in Combination with Space-Time Diversity for Broadband OFDM Systems," IEEE International Conference on Communications, 2002. ICC 2002, New York, NY, Apr. 28-May 2, 2002, vol. 1, pp. 165-171.

Kaiser. "Spatial Transmit Diversity Techniques for Broadband OFDM Systems," IEEE Global Telecommunications Conference, 2000. GLOBECOM'00. San Francisco, CA, Nov. 27-Dec. 1, 2000, vol. 3, pp, 1824-1828.

Narula, et al., "Performance Limit of Coded Diversity Methods for Transmitter Antenna Arrays," IEEE Transactions on Information Theory, vol. 45, No. 7, Nov. 1999, pp. 2418-2433.

Pan, et al., "Dynamic Sub-channel Allocations with Adaptive Beamforming for Broadband OFDM Wireless Systems," IEEE Global Telecommunications Conference, 2002. GLOBECOM '02. Taipei, Taiwan, Nov. 17-21, 2002, New York, NY, Nov. 17, 2002, vol. 1, pp. 711-715.

IEEE Std. 802.11a-1999, Part 11: Wireless LAN Medium Access Control (MAC) and Physical Layer (PHY) Specifications, Amendment 1: High-Speed Physical Layer in the 5 GHz Band.

IEEE Std. 802.11g-2003, Part 11: Wireless LAN Medium Access Control (MAC) and Physical Layer (PHY) Specifications, Amendment 4: Further Higher Data Rate Extension in the 2.4 GHz Band.

International Search Report—PCT/US05/015040, International Search Authority—European Patent Office, Sep. 6, 2005.

Written Opinion—PCT/US05/015040, International Search Authority—European Patent Office, Sep. 6, 2005.

International Preliminary Examination Report—PCT/US05/015040—IPEA/US, May 12, 2006.

Agustin et al., "LDC Construction With a Defined Structure,"Vehicular Technology Conference, XP010700754, Oct. (2003).

B.M Hochwald et al., "Systematic Design of Unitary Space-Time Constellations,"IEEE Trans. on it.vol. 46, No. 6, Sep. 2000.

Bem et al., "Smart Antennas for Mobile Communications Systems," International Conference on Microwaves, Radar and Wireless Communications. vol. 3, May 22, 2000, pp. 120-130, XP010537479.

Bourdoux et al., "Non-reciprocal transceivers in OFDM/SDMA Systems: Impact and Mitigation," Radio and Wireless Conference, Aug. 10, 2003. pp. 183-186, XP010656728.

Bruhl et al., "Investigation of Front-end Requirements for MIMO-Systems Using Downlink Pre-Distortion," European Personal Mobile Communications Conference, 2003, pp. 472-476, XP002330243.

Jungnickel et al., "A Mimo System with Reciprocal Transceivers for the Time-division Duplex Mode," Antennas and Propagation Society International Symposium, vol. 2, Jun. 20. 2004, pp. 1267-1270, XP010721570.

Laroia R et al., "Enhanced Opportunistic Beamforming," Vehicular Technology Conference, 2003, VTC 2003-Fall. IEEE 58TH Orlando, FL, USA Oct. 6-9, 2003, pp. 1762-1766, XP010702878.

Liu et al., "OFDM-MIMO WLAN AP Front-end Gain and Phase Mismatch Calibration," IEEE Radio and Wireless Conference. Sep. 2004. pp. 151-154. XP002330244.

T.L. Marzetta, B. Hassibi, B.M Hochwald, "Structured Unitary Space-Time Autocoding Constellations,"IEEE Trans. on it,vol. 48, No. 4, Apr. 2002.

Crow, I.: "The Fourier Matrix," Apr. 27, 2001, http://www.maths.abdn.ac.uk/~igc/tch/mx4002/notes/node91.html. pp. 1-3.

"Part 11. Wireless LAN Medium Access Control (MAC) and Physical Layer (PHY) Specifications: High-Speed Physical Layer in the 5GHz Band," IEEE Standards 802.11a, Sep. 1999.

Auer, G., Channel Estimation for OFDM With Cyclic Delay Diversity, Personal, Indoor and Mobile Radio Communications, 2004. PIMRC 2004, 15TH IEEE International Symposium on, Sep. 5, 2004, vol. 3, pp. 1792-1796.

Bauch, et al., "Orthogonal Frequency Division Multiple Access with Cyclic Delay Diversity," ITG Workshop on Smart Antennas, Munich Germany, Mar. 18-19, 2004, pp. 17-24.

Masoud Sharif, Babak Hassibi, On the Capacity of MIMO Broadcast Channel With Partial Side Information, Signals, Systems and Computers, 2003, Conference Record of the Thirty-Seventh ASILOMAR Conference, Nov. 12, 2003.

Antenna-Theory.com, "Steering Vector", http://www.antenna-theory.com, pp. 1., No date given. (Cited by USPTO Examiner in U.S. Appl. No. 10/821,390 on Jan. 11, 2011).

Bello: "Characterization of Randomly Time-Variante Linear Channels," Communications Systems, IEEE transactions on, vol. 11, Issue 4, pp. 360-393, Dec. 1963.

Doonstnejad et al, "Space-time Spreading Codes for a Multiuser MIMO System," Institute of Electrical and Electronics Engineers, Conference Record of the 36th. Asilomar Conference on Signals, Systems, & Computers, Pacific Grove, California, Nov. 3-6, 2002, pp. 1374-1378, XP10638423.

Farrokhi et al., "Link-Optimal Space-Time Processing with Multiple Transmit and Receive Antennas, " IEEE Communications Letters, Vol. 5, No. 3, pp. 85-87(Mar. 2001).

Giacomantone, Javier Oscar, "Tradeoffs in Arithmetic Architectures for Cordic Algorithm Design." pp. 1-9, CeTAD—Fac. De Ingenieria—UNLP.

Goldsmith, Andrea et al., "Capacity Limits of MIMO Channels, " IEEE Journal on Selected Areas in Communications, Vol. 21, No. 5, pp. 684-702, Jun. 2003.

Gotze, J., et al., "An Algorithm and Architecture Based on Orthonormal Mu-Rotations for Computing the Symmetric EVD" Integration, The VLSI Journal, North-Holland Publishing Company. Amsterdam, NL, vol. 20, No. 1, Dec. 1, 1995, pp. 21-39.

Griffin, Grant R., "Cordic FAQ," Iowegian's dspGuru. pp. 1-6.

Hanzo et al., Single and Multi-Carrier Ds-CDMA, "Space-Time Spreading Aided Single-Carrier Wideband CDMA Communicating Over Multipath Nakagami Fading Channels," Chapter 8, pp. 279-310, John Wiley & Sons, England, 2003 (XP-002357231).

Hemkumar N. D., et al. "Efficient Complex Matrix Transformations with CORDIC" Computer Arithmetic, 1994. Proceedings., 11th Symposium on Windsor, Ont., Canada Jun. 29-Jul. 2, 1993, Los Alamitos, CA, USA, IEEE Comput. Soc, Jun. 29, 1993, pp. 122-129.

Hochwald et al., "A Transmitter Diversity Scheme for Wideband CDMA Systems based on Space-time Spreading", Selected Areas in Communications, vol. 19, No. 1, Jan. 2001.

Hochwald et al., "Unitary Space-Time Modulation for Multiple-Antenna Communications in Rayleigh Flat Fading, " IEEE Transactions on Information Theory, vol. 46, No. 2, pp. 543-564 (2000).

Hsiao, S. et al.: "Parallel Singular Value Decomposition of Complex Matrices Using Multidimensional Cordic Algorithms" IEEE Transactions of Signal Processing, IEEE Service Center, New York, NY, UA, vol. 44, No. 3, pp. 685-697, Mar. 1, 1996.

Jihoon Choi et al., "Interpolation Based Transmit Beamforming for MIMO-OFDM with Limited Feedback", IEEE Communications Society, 2004, 249-253, Austin, Texas.

Ketchum, John, et al., "PHY Design for Spatial Multiplexing MIMO WLAN," IEEE 802.11-04/0721r0, IEEE, Jul. 2004, pp. 1-33 (Spatial Spreading Mode, Intrinsic Transmission Mode).

Kim, M. et al.: "Design of Jacobi EVD Processor Based on CORDIC for DOA Estimation with Music Algorithm." Personal, Indoor, and Mobile Radio Communications, 2002. pp. 120-124, The 13th IEEE International Symposium on Sep. 15-18, 2002, Piscataway, NJ, USA, IEEE.

Li, et al., "Transmit Diversity Over Quasi-Static Fading Channels Using Multiple Antennas and Random Signal Mapping," IEEE Transactions on Communications, vol. 51, No. 11, Nov. 2003, pp. 1918-1926.

Liu, Jung-Tao: "Successive decoding of multiple space time coded streams in multi-input multi-output systems," Global Telecommunications Conference, 2002. Globecom '02. IEEE, USA, Nov. 21, 2002, 1007-1011 vol. 1.

Medles et al., "Multistream Space-Time Coding by Spatial Spreading, Scrambling and Delay Diversity," IEEE International Conference on Acoustics, Speech and Signal Processing, vol. 4 of 4, XP-10803892, pp. 2429-2432 (2002).

Michalke C et al: Efficient tracking of eigenspaces and its application to eigenbeanforming Personal, Indoor and Mobile Radio Communications 14th IEEE Proceedings, Sep. 7, 2003, pp. 2847-2851, Sections II.B and III.C XP010678152.

Nowak, et al., "An Efficient Implementation of a 256-point FFT Processor with Cordic for OFDM Systems," Delft University of Technology, Faculty of Information Technology and Systems Circuits and Systems Group, pp. 427-434, ISBN: 90-73461-15-4. 1998. STW, 1998 1026-01:.

Oksa G et al: "Multi-level parallelism in the block-jacobi SVD algorithm" Parallel and Distribution Processing, 2001. Proceedings. Ninth Euromicr O Workshop. IEEE, Feb. 7, 2001, pp. 306-313, XP010532138, ISBN: 978-0/7695-0987-7.

Ralf Seeger et al: "Advance Eigenbeamforming for the 3GPP UMTS FDD Downlink" ITG IEEE Workshop on Smart Antennas, XX, XX, Apr. 4, 2004, pp. 1-8, XP002468805, Section III.

Schafer F., et al.: "Efficient Tracking of Eigenspaces and its application to MIMO systems" Proceedings of the IST Mobile and Wireless Communications Summit, Jun. 18, 2003, pp. 1-6, XP002478514.

Suthaharan, et al., Space-time coded MIMO-OFDM for high capacity and high data-rate wireless communication over frequency selective fading channels, Mobile and Wireless Communications Networks, 2002. 4th International Workshop on, USA, Sep. 11, 2002, 424-428.

Winters, J. "Smart antennas for wireless systems", IEEE Personal Communications, Dec. 5, 2003, pp. 1-113.

Yao, Huan, "Efficient Signal, Code, and Receiver Designs for MIMO Communication Systems," Ph.D. Thesis, Massachusetts Institute of Technology, Cambridge, Massachusetts, 2003.

Yu and Cioffi, "Trellis Precoding for the Broadcast Channel," IEEE Global Telecommunications Conference, Vol. 2, Electrical Engineering Department, Stanford, University, Stanford, California (2001), pp. 1344-1348.

Branka et al., "Performance Limits of Multiple-Input Multiple-Output Wireless Communication Systems", Space-Time Coding, John Wiley & Sons. Ltd, Apr. 2003, England, pp. 1-9.

Sharif et al., "On the Capacity of Mimo Broadcast Channel with Partial Side Information", Department of Electrical Engineering, CA Institute of Engineering, IEEE 2002, pp. 958-962.

Taiwan Search Report—TW094114572—TIPO—Sep. 14, 2011.
Taiwan Search Report—TW094130237—TIPO—Oct. 3, 2011.

* cited by examiner

US 8,285,226 B2

STEERING DIVERSITY FOR AN OFDM-BASED MULTI-ANTENNA COMMUNICATION SYSTEM

CLAIM OF PRIORITY UNDER 35 U.S.C. §119

The present Application for Patent claims priority to Provisional Application Ser. No. 60/569,103, entitled "Steering Diversity for an OFDM-Based Multi-Antenna Communication System," filed May 7, 2004, and assigned to the assignee hereof and hereby expressly incorporated by reference herein.

BACKGROUND

I. Field

The present invention relates generally to communication, and more specifically to data transmission in a multi-antenna communication system that utilizes orthogonal frequency division multiplexing (OFDM).

II. Background

OFDM is a multi-carrier modulation technique that effectively partitions the overall system bandwidth into multiple (K) orthogonal subbands, which are also referred to as tones, subcarriers, bins, and frequency channels. With OFDM, each subband is associated with a respective subcarrier that may be modulated with data. OFDM is widely used in various wireless communication systems, such as those that implement the well-known IEEE 802.1a and 802.11g standards. IEEE 802.1a and 802.1g generally cover single-input single-output (SISO) operation whereby a transmitting device employs a single antenna for data transmission and a receiving device normally employs a single antenna for data reception.

A multi-antenna communication system may support communication for both single-antenna devices and multi-antenna devices. In this system, a multi-antenna device may utilize its multiple antennas for data transmission to a single-antenna device. The multi-antenna device and the single-antenna device may implement any one of a number of conventional transmit diversity schemes in order to obtain transmit diversity and improve performance for the data transmission. One such transmit diversity scheme is described by S. M. Alamouti in a paper entitled "A Simple Transmit Diversity Technique for Wireless Communications," IEEE Journal on Selected Areas in Communications, Vol. 16, No. 8, October 1998, pp. 1451-1458. For the Alamouti scheme, the transmitting device transmits each pair of modulation symbols from two antennas in two symbol periods, and the receiving device combines two received symbols obtained in the two symbol periods to recover the pair of modulation symbols sent by the transmitting device. The Alamouti scheme as well as most other conventional transmit diversity schemes require the receiving device to perform special processing, which may be different from scheme to scheme, in order to recover the transmitted data and obtain the benefits of transmit diversity.

A "legacy" single-antenna device may be designed for SISO operation only, as described below. This is normally the case if the wireless device is designed for the IEEE 802.11a or 802.11g standard. Such a legacy single-antenna device would not be able to perform the special processing required by most conventional transmit diversity schemes. Nevertheless, it is still highly desirable for a multi-antenna device to transmit data to the legacy single-antenna device in a manner such that greater reliability and/or improved performance can be achieved.

There is therefore a need in the art for techniques to achieve transmit diversity in an OFDM-based system, especially for legacy single-antenna devices.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
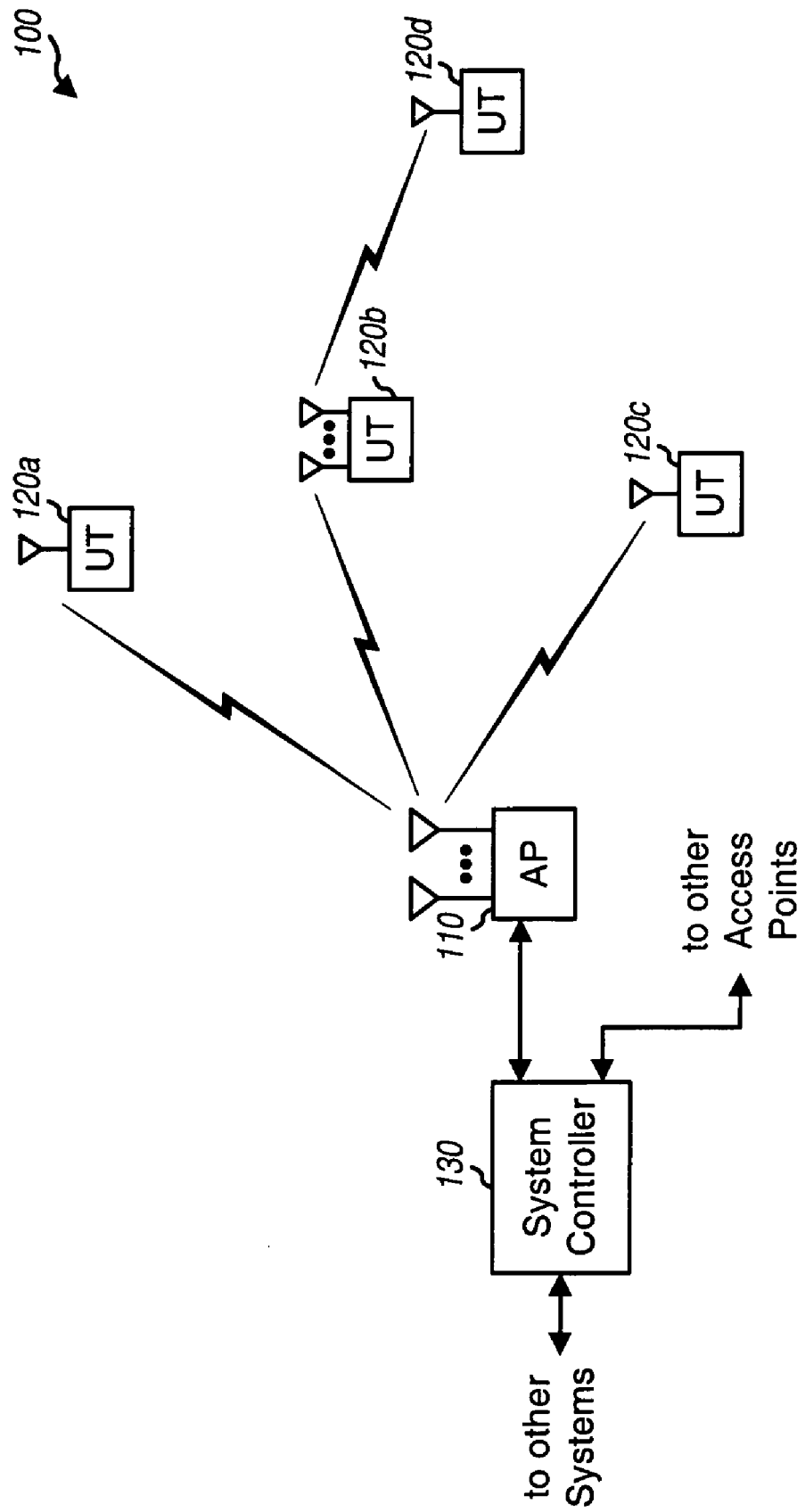
FIG. 1 shows a multi-antenna system with an access point and user terminals.

FIG. 1 shows a multi-antenna system 100 with an access point (AP) 110 and user terminals (UTs) 120. An access point is generally a fixed station that communicates with the user terminals and may also be referred to as a base station or some other terminology. A user terminal may be fixed or mobile and may also be referred to as a mobile station, a wireless device, a user equipment (UE), or some other terminology. For a centralized architecture, a system controller 130 couples to the access points and provides coordination and control for these access points.

Access point 110 is equipped with multiple antennas for data transmission and reception. Each user terminal 120 may be equipped with a single antenna or multiple antennas for data transmission and reception. A user terminal may communicate with the access point, in which case the roles of access point and user terminal are established. A user terminal may also communicate peer-to-peer with another user terminal. In the following description, a transmitting entity is equipped with multiple (T) transmit antennas, and a receiving entity may be equipped with a single antenna or multiple (R) antennas. A multiple-input single-output (MISO) transmission exists when the receiving entity is equipped with a single antenna, and a multiple-input multiple-output (MIMO) transmission exists when the receiving entity is equipped with multiple antennas.

Figure 2:
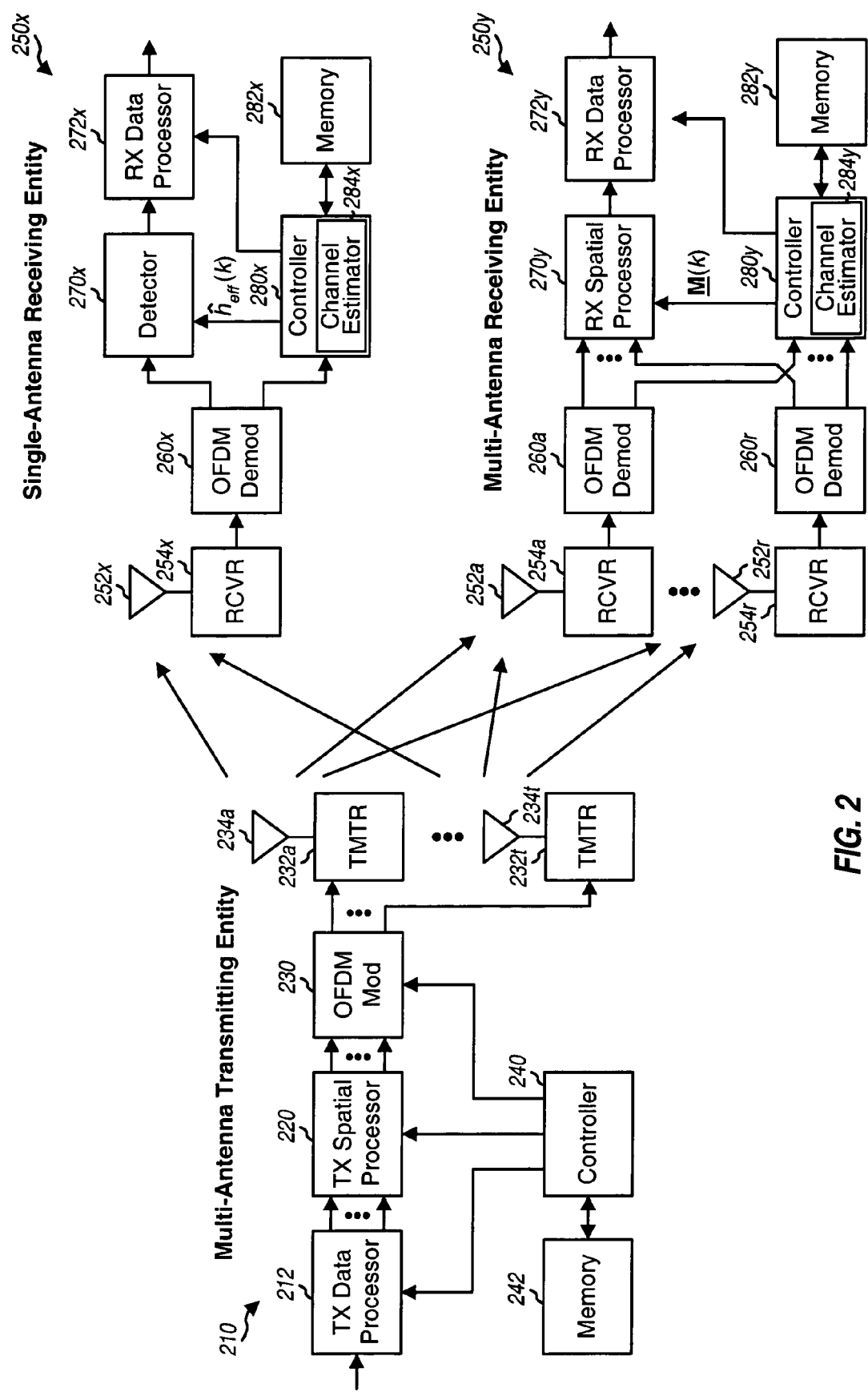
FIG. 2 shows a block diagram of a multi-antenna transmitting entity, a single-antenna receiving entity, and a multi-antenna receiving entity.

FIG. 2 shows a block diagram of a multi-antenna transmitting entity 210, a single-antenna receiving entity 250x, and a multi-antenna receiving entity 250y in system 100. Transmitting entity 210 may be an access point or a multi-antenna user terminal. Each receiving entity 250 may also be an access point or a user terminal.

At transmitting entity 210, a transmit (TX) data processor 212 processes (e.g., encodes, interleaves, and symbol maps) traffic/packet data and generates data symbols. As used herein, a "data symbol" is a modulation symbol for data, a "pilot symbol" is a modulation symbol for pilot (which is data that is known a priori by both the transmitting and receiving entities), a "transmit symbol" is a symbol to be sent from a transmit antenna, and a "received symbol" is a symbol obtained from a receive antenna. A TX spatial processor 220 receives and demultiplexes pilot and data symbols onto the proper subbands, performs spatial processing as appropriate, and provides T streams of transmit symbols for the T transmit antennas. An OFDM modulator (Mod) 230 performs OFDM modulation on the T transmit symbol streams and provides T streams of samples to T transmitter units (TMTR) 232a through 232t. Each transmitter unit 232 processes (e.g., converts to analog, amplifies, filters, and frequency upconverts) its transmit symbol stream and generates a modulated signal. Transmitter units 232a through 232t provide T modulated signals for transmission from T antennas 234a through 234t, respectively.

At single-antenna receiving entity 250x, an antenna 252x receives the T transmitted signals and provides a received signal to a receiver unit (RCVR) 254x. Receiver unit 254x performs processing that is complementary to the processing performed by transmitter units 232 and provides a stream of samples. An OFDM demodulator (Demod) 260x performs OFDM demodulation on the sample stream to obtain received data and pilot symbols, provides the received data symbols to a detector 270x, and provides the received pilot symbols to a channel estimator 284x within a controller 280x. Channel estimator 284x derives channel estimates for the effective SISO channels between transmitting entity 210 and receiving entity 250x for subbands used for data transmission. Detector 270x performs detection on the received data symbols for each subband based on the effective SISO channel estimate for that subband and provides a stream of detected symbols for all subbands. A receive (RX) data processor 272x then processes (e.g., symbol demaps, deinterleaves, and decodes) the detected symbol stream and provides decoded data.

At multi-antenna receiving entity 250y, R antennas 252a through 252r receive the T transmitted signals, and each antenna 252 provides a received signal to a respective receiver unit 254. Each receiver unit 254 processes a respective received signal and provides a sample stream to an associated OFDM demodulator 260. Each OFDM demodulator 260 performs OFDM demodulation on its sample stream to obtain received data and pilot symbols, provides the received data symbols to an RX spatial processor 270y, and provides the received pilot symbols to a channel estimator 284y within a controller 280y. Channel estimator 284y derives channel estimates for the actual or effective MIMO channels between transmitting entity 210 and receiving entity 250y for subbands used for data transmission. Controller 280y derives spatial filter matrices based on the MIMO channel estimates. RX spatial processor 270y performs receiver spatial processing (or spatial matched filtering) on the received data symbols for each subband with the spatial filter matrix derived for that subband and provides detected symbols for the subband. An RX data processor 272y then processes the detected symbols for all subbands and provides decoded data.

Controllers 240, 280x, and 280y control the operation of the processing units at transmitting entity 210 and receiving entities 250x and 250y, respectively. Memory units 242, 282x, and 282y store data and/or program code used by controllers 240, 280x, and 280y, respectively.

Figure 3:
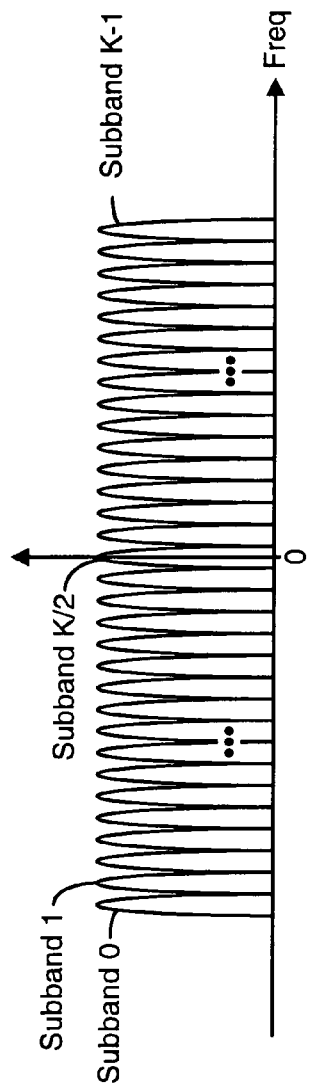
FIG. 3 shows an OFDM waveform in the frequency domain.

FIG. 3 shows an OFDM waveform in the frequency domain. OFDM provides K total subbands, and the subcarrier for each subband may be individually modulated with data. Of the K total subbands, $N_D$ subbands may be used for data transmission, $N_P$ subbands may be used for pilot transmission, and the remaining $N_G$ subbands may be unused and serve as guard subbands, where $K=N_D+N_P+N_G$. For example, 802.11a utilizes an OFDM structure that has 64 total subbands, of which 48 subbands are used for data transmission, 4 subbands are used for pilot transmission, and 12 subbands are unused. In general, system 100 may utilize any OFDM structure with any number of data, pilot, guard, and total subbands. For simplicity, the following description assumes that all K subbands are usable for data and pilot transmission.

Figure 4:
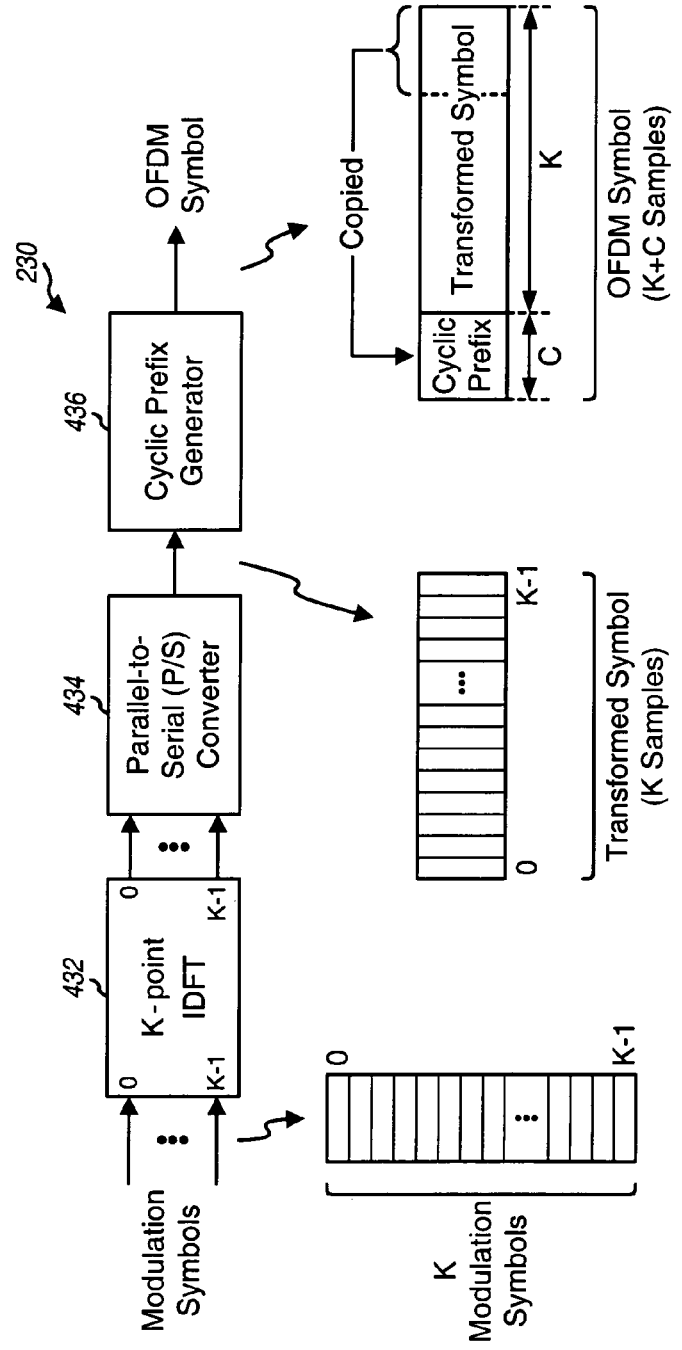
FIG. 4 shows a block diagram of an OFDM modulator.

FIG. 4 shows a block diagram of OFDM modulator 230 at transmitting entity 210. The data to be transmitted (or information bits) is typically first encoded to generate code bits, which are then interleaved. The interleaved bits are then grouped into B-bit binary values, where $B \geq 1$. Each B-bit value is then mapped to a specific modulation symbol based on a modulation scheme selected for use (e.g., M-PSK or M-QAM, where $M=2^B$). Each modulation symbol is a complex value in a signal constellation for the selected modulation scheme. In each OFDM symbol period, one modulation symbol may be transmitted on each subband. (A signal value of zero, which is also called a zero symbol, is usually provided for each unused subband.) An inverse discrete Fourier transform (IDFT) unit 432 receives K modulation symbols for the K subbands in each OFDM symbol period, transforms the K modulation symbols to the time domain with a K-point IDFT, and provides a "transformed" symbol that contains K time-domain samples. Each sample is a complex-value to be transmitted in one sample period. A parallel-to-serial (P/S) converter 434 serializes the K samples for each transformed symbol. A cyclic prefix generator 436 then repeats a portion (or C samples) of each transformed symbol to form an OFDM symbol that contains K+C samples. The cyclic prefix is used to combat inter-symbol interference (ISI) caused by frequency selective fading, which is a frequency response that varies across the overall system bandwidth. An OFDM symbol period (which is also referred to herein as simply a "symbol period") is the duration of one OFDM symbol and is equal to K+C sample periods.

In system 100, a MISO channel exists between a multi-antenna transmitting entity and a single-antenna receiving entity. For an OFDM-based system, the MISO channel formed by the T antennas at the transmitting entity and the single antenna at the receiving entity may be characterized by a set of K channel response row vectors, each of dimension 1×T, which may be expressed as:

$$\underline{h}(k)=[h_0(k) h_1(k) \ldots h_{T-1}(k)], \text{ for } k=0,\ldots,K-1, \quad \text{Eq (1)}$$

where k is an index for subband and $h_i(k)$, for $i=0, \ldots, T-1$, denotes the coupling or complex gain between transmit antenna i and the single receive antenna for subband k. For simplicity, the MISO channel response $\underline{h}(k)$ is shown as a function of only subband k and not time.

If the transmitting entity has an accurate estimate of the MISO channel response, then it may perform spatial processing to direct a data transmission toward the receiving entity. However, if the transmitting entity does not have an accurate estimate of the wireless channel, then the T transmissions from the T antennas cannot be intelligently adjusted based on the wireless channel.

When an accurate channel estimate is not available, the transmitting entity may transmit data from its T antennas to the single-antenna receiving entity using steering diversity to achieve transmit diversity, greater reliability, and/or improved performance. With steering diversity, the transmitting entity performs spatial processing such that the data transmission observes different effective channels across the subbands used for data transmission. Consequently, performance is not dictated by a bad channel realization. The spatial processing for steering diversity is also such that the single-antenna receiving entity can perform the normal processing for SISO operation (and does not need to do any other special processing for transmit diversity) in order to recover the data transmission and enjoy the benefits of transmit diversity. For clarity, the following description is generally for one OFDM symbol, and the index for time is omitted.

Figure 5:
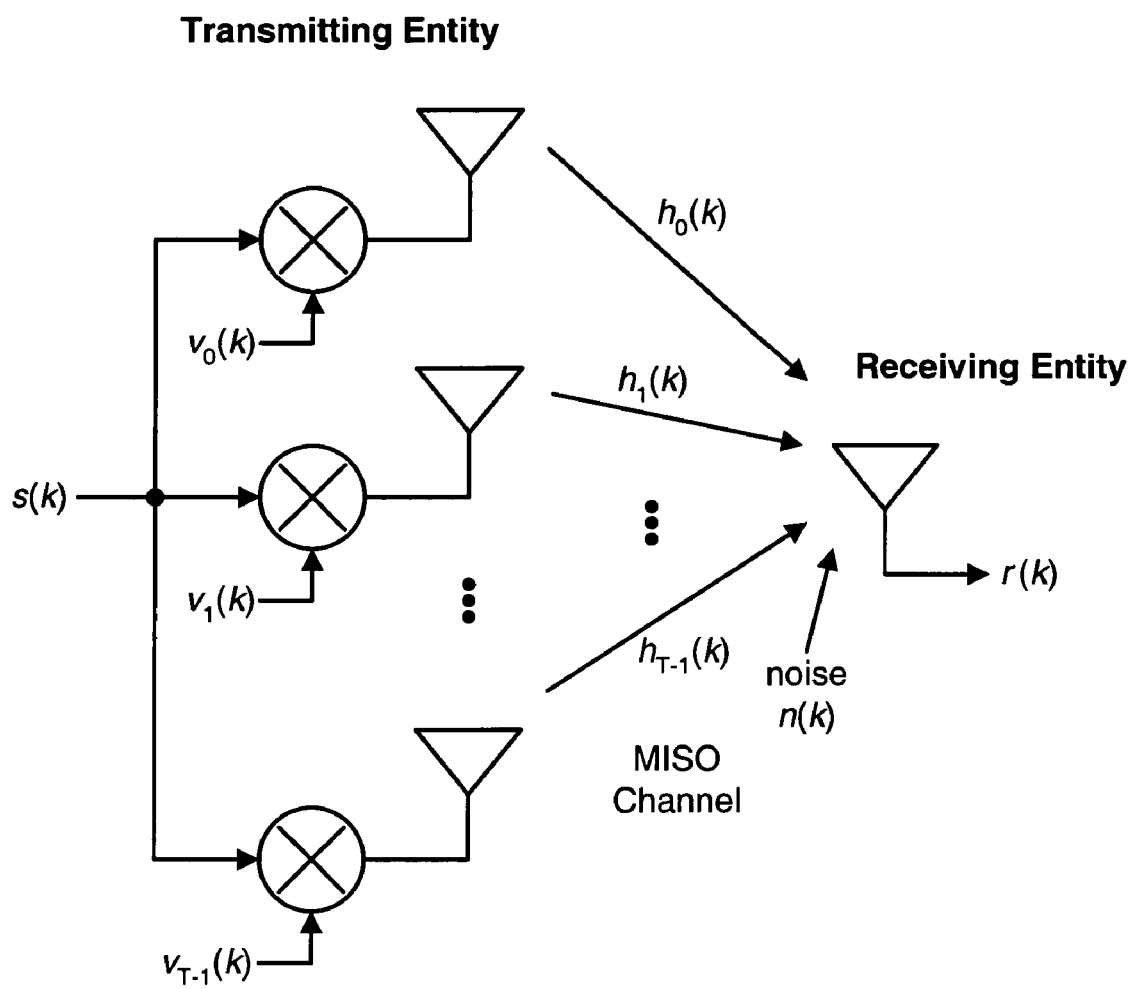
FIG. 5 shows a model for transmission with steering diversity for one subband.

FIG. 5 shows a model for transmission with steering diversity for one subband k from multi-antenna transmitting entity 210 to single-antenna receiving entity 250x. A modulation symbol s(k) to be sent on subband k is spatially processed with T complex weights (or scalar values) $v_0(k)$ through $v_{T-1}(k)$ to obtain T transmit symbols for subband k, which are then processed and sent from the T transmit antennas. The T transmit symbols for subband k observe channel responses of $h_0(k)$ through $h_{T-1}(k)$.

The transmitting entity performs spatial processing for each subband k for steering diversity, as follows:

$$\underline{x}(k) = \underline{v}(k) \cdot s(k), \text{ for } k=0,\ldots,K-1, \quad \text{Eq (2)}$$

where s(k) is a modulation symbol to be sent on subband k;

$\underline{v}(k) = [v_0(k)\ v_{T-1}(k) \ldots v_{T-1}(k)]^T$ is a T×1 steering vector for subband k;

$\underline{x}(k) = [x_0(k)\ x_1(k) \ldots x_{T-1}(k)]^T$ is a T×1 vector with T transmit symbols to be sent from the T transmit antennas on subband k; and "$T$" denotes a transpose.

In general, the modulation symbol s(k) may be any real or complex value (e.g., a signal value of zero) and does not need to be from a signal constellation.

The received symbols at the receiving entity for each subband k may be expressed as:

$$\begin{aligned} r(k) &= \underline{h}(k) \cdot \underline{x}(k) + n(k), \\ &= \underline{h}(k) \cdot \underline{v}(k) \cdot s(k) + n(k), \text{ for } k=0,\ldots,K-1, \\ &= h_{eff}(k) \cdot s(k) + n(k), \end{aligned} \quad \text{Eq (3)}$$

where r(k) is a received symbol for subband k;
$h_{eff}(k)$ is an effective SISO channel response for subband k, which is $h_{eff}(k) = \underline{h}(k) \cdot \underline{v}(k)$; and
n(k) is the noise for subband k.

As shown in equation (3), the spatial processing by the transmitting entity for steering diversity results in the modulation symbol s(k) for each subband k observing the effective SISO channel response $h_{eff}(k)$, which includes the actual MISO channel response $\underline{h}(k)$ and the steering vector $\underline{v}(k)$ for that subband. The receiving entity can estimate the effective SISO channel response $h_{eff}(k)$, for example, based on pilot symbols received from the transmitting entity. The receiving entity can then perform detection or matched filtering on the received symbol r(k) for each subband k with the effective SISO channel response estimate $\hat{h}_{eff}(k)$ for that subband to obtain a detected symbol $\hat{s}(k)$, which is an estimate of the modulation symbol s(k) transmitted on the subband.

The receiving entity may perform matched filtering as follows:

$$\hat{s}(k) = \frac{\hat{h}^*_{eff}(k) \cdot r(k)}{|\hat{h}_{eff}(k)|^2} = s(k) + n'(k), \quad \text{Eq (4)}$$

where "*" denotes a conjugate and n'(k) is the noise after the matched filtering. The detection operation in equation (4) is the same as would be performed by the receiving entity for a SISO transmission. However, the effective SISO channel response estimate, $\hat{h}_{eff}(k)$, is used for detection instead of a SISO channel response estimate, $\hat{h}(k)$.

For steering diversity, the receiving entity does not need to know whether a single antenna or multiple antennas are used for data transmission and also does not need to know the steering vector used for each subband. The receiving entity can nevertheless enjoy the benefits of transmit diversity if different steering vectors are used across the subbands and different effective SISO channels are formed for these subbands. A data transmission sent across multiple subbands would then observe an ensemble of different effective SISO channels across the subbands used for data transmission.

Figure 6:
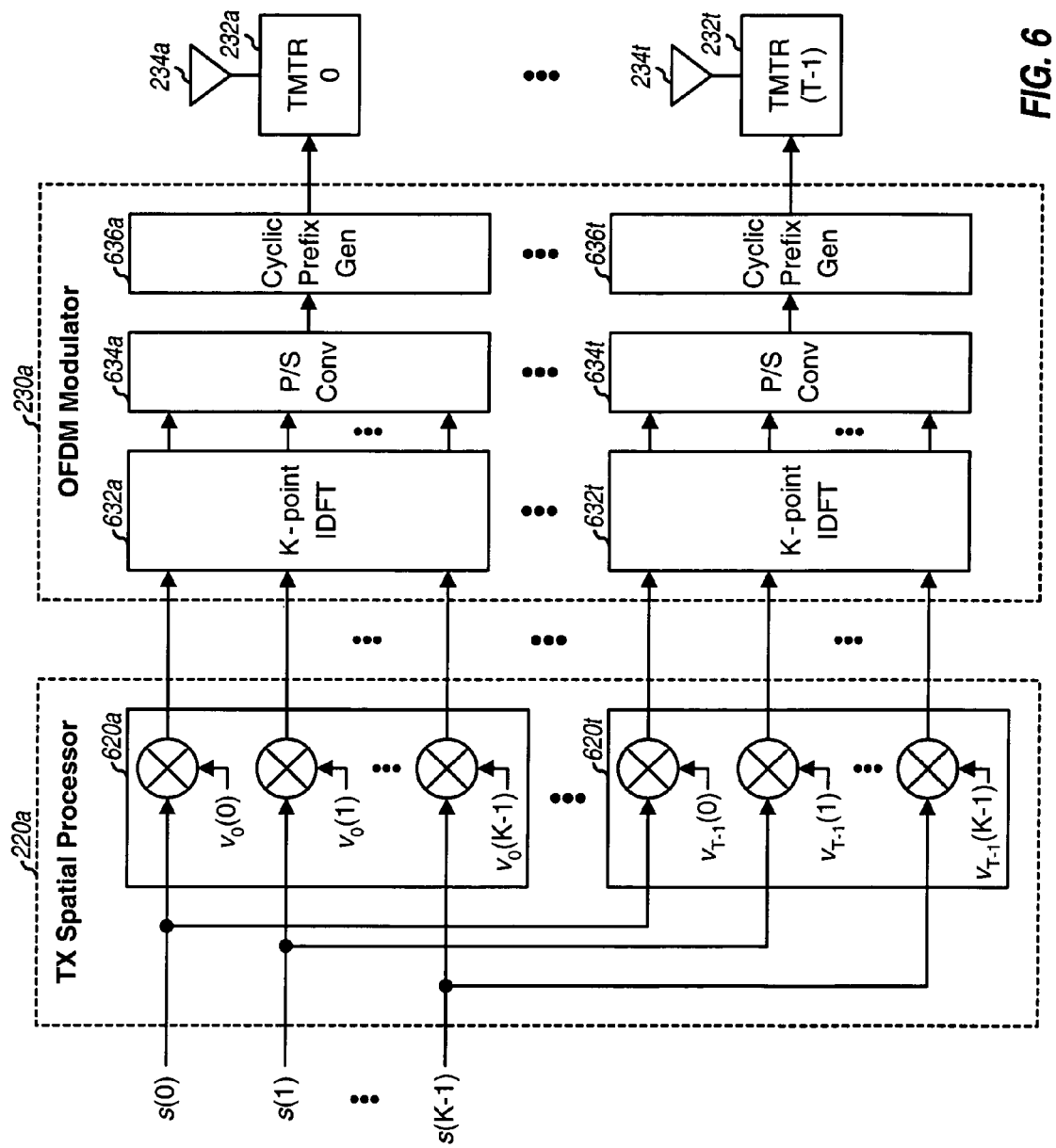
FIG. 6 shows a transmit (TX) spatial processor and an OFDM modulator.

FIG. 6 shows a block diagram of a TX spatial processor 220a and an OFDM modulator 230a, which are an embodiment of TX spatial processor 220 and OFDM modulator 230, respectively, in FIG. 2. TX spatial processor 220a receives K modulation symbols (or generically, input symbols) s(0) through s(K-1) for the K subbands for each OFDM symbol period. Within TX spatial processor 220a, a different set of K multipliers 620 multiplies the K modulation symbols with a set of K weights $v_i(0)$ through $v_i(K-1)$ for each transmit antenna i and provides K weighted symbols for that antenna. The modulation symbol s(k) for each subband k is transmitted from all T antennas and is multiplied with T weights $v_0(k)$ through $v_{T-1}(k)$ for the T transmit antennas for that subband. TX spatial processor 220a provides T sets of K weighted symbols for the T transmit antennas.

Within OFDM modulator 230a, the set of K weighted symbols for each transmit antenna i is transformed to the time-domain by a respective IDFT unit 632 to obtain a transformed symbol for that antenna. The K time-domain samples for the transformed symbol for each transmit antenna i are serialized by a respective P/S converter 634 and further appended with a cyclic prefix by a cyclic prefix generator 636 to generate an OFDM symbol for that antenna. The OFDM symbol for each transmit antenna i is then conditioned by transmitter unit 232 for that antenna and transmitted via the antenna.

For steering diversity, the transmitting entity uses different steering vectors for different subbands, with each steering vector defining or forming a beam for the associated subband. In general, it is desirable to use as many different steering vectors as possible across the subbands to achieve greater transmit diversity. For example, a different steering vector may be used for each of the K subbands, and the set of K steering vectors used for the K subbands may be denoted as {$\underline{v}(k)$}. For each subband, the steering vector may be the same over time or may change, e.g., from symbol period to symbol period.

In general, any steering vector may be used for each of the K subbands for steering diversity. However, to ensure that performance is not degraded for single-antenna devices that are not aware of the steering diversity being performed and further rely on some correlation across the subbands, the steering vectors may be defined such that the beams vary in a continuous instead of abrupt manner across the subbands. This may be achieved by applying continuously changing phase shifts across the subbands for each transmit antenna. As an example, the phase shifts may change in a linear manner across the subbands for each transmit antenna, and each antenna may be associated with a different phase slope, as described below. The application of linearly changing phase shifts to modulation symbols in the frequency domain may be achieved by temporally modifying (e.g., either delaying or circularly shifting) the corresponding time-domain samples. If different steering vectors are used for different subbands, then the modulation symbols for these subbands are beamed in different directions by the array of N transmit antennas. If encoded data is spread over multiple subbands with different steering, then decoding performance will likely improve due to the increased diversity.

If the steering vectors for adjacent subbands generate beams in very different directions, then the effective SISO channel response $h_{eff}(k)$ would also vary widely among the adjacent subbands. Some receiving entities may not be aware of steering diversity being performed, such as legacy single-antenna devices in an IEEE 802.11a system. These receiving entities may assume that the channel response varies slowly across the subbands and may perform channel estimation in a manner to simplify the receiver design. For example, these receiving entities may estimate the channel response for a subset of the K total subbands and use interpolation or some other techniques to derive estimates of the channel response for the other subbands. The use of abruptly changing steering vectors (e.g., pseudo-random steering vectors) may severely degrade the performance of these receiving entities.

To provide transmit diversity and avoid degrading the performance of legacy receiving entities, the steering vectors may be selected such that (1) different beams are used for different subbands and (2) the beams for adjacent subbands have smooth instead of abrupt transitions. The weights to use for the K subbands of the T transmit antennas may be expressed as:

$$\underline{V} = [\underline{v}(0) \ \underline{v}(1) \ \ldots \ \underline{v}(K-1)] = \begin{bmatrix} v_0(0) & v_0(1) & \ldots & v_0(K-1) \\ v_1(0) & v_1(1) & \ldots & v_1(K-1) \\ \vdots & \vdots & \ddots & \vdots \\ v_{T-1}(0) & v_{T-1}(1) & \ldots & v_{T-1}(K-1) \end{bmatrix}, \quad \text{Eq (5)}$$

where $\underline{V}$ is a T×K matrix of weights for the K subbands of the T transmit antennas.

In an embodiment, the weights in the matrix $\underline{V}$ are defined as follows:

$$v_i(k) = B(i) \cdot e^{j\frac{2\pi \cdot i \cdot k}{K}}, \text{ for } i = 0, \ldots, T-1 \text{ and } k = 0, \ldots, K-1, \quad \text{Eq (6)}$$

where B(i) is a complex gain for transmit antenna i;
$v_i(k)$ is the weight for subband k of transmit antenna i; and
j is the imaginary value defined by $j=\sqrt{-1}$.

The magnitude of the complex gain for each transmit antenna may be set to one, or $\|B(i)\|=1.0$ for $i=0, \ldots, T-1$. The weights shown in equation (6) correspond to a progressive phase shift for each subband and antenna. These weights effectively form a slightly different beam for each subband for a linear array of T equally spaced antennas.

In a specific embodiment, the weights are defined as follows:

$$v_i(k) = e^{-j\pi \cdot i} \cdot e^{j\frac{2\pi \cdot i \cdot k}{K}} = e^{j2\pi \frac{i}{K}(k - \frac{K}{2})}, \quad \text{Eq (7)}$$

for $i=0, \ldots, T-1$ and $k=0, \ldots, K-1$. The embodiment shown in equation (7) uses $B(i)=e^{-j\pi \times i}$ for equation (6). This results in a different phase shift being applied to each antenna.

Figure 7:
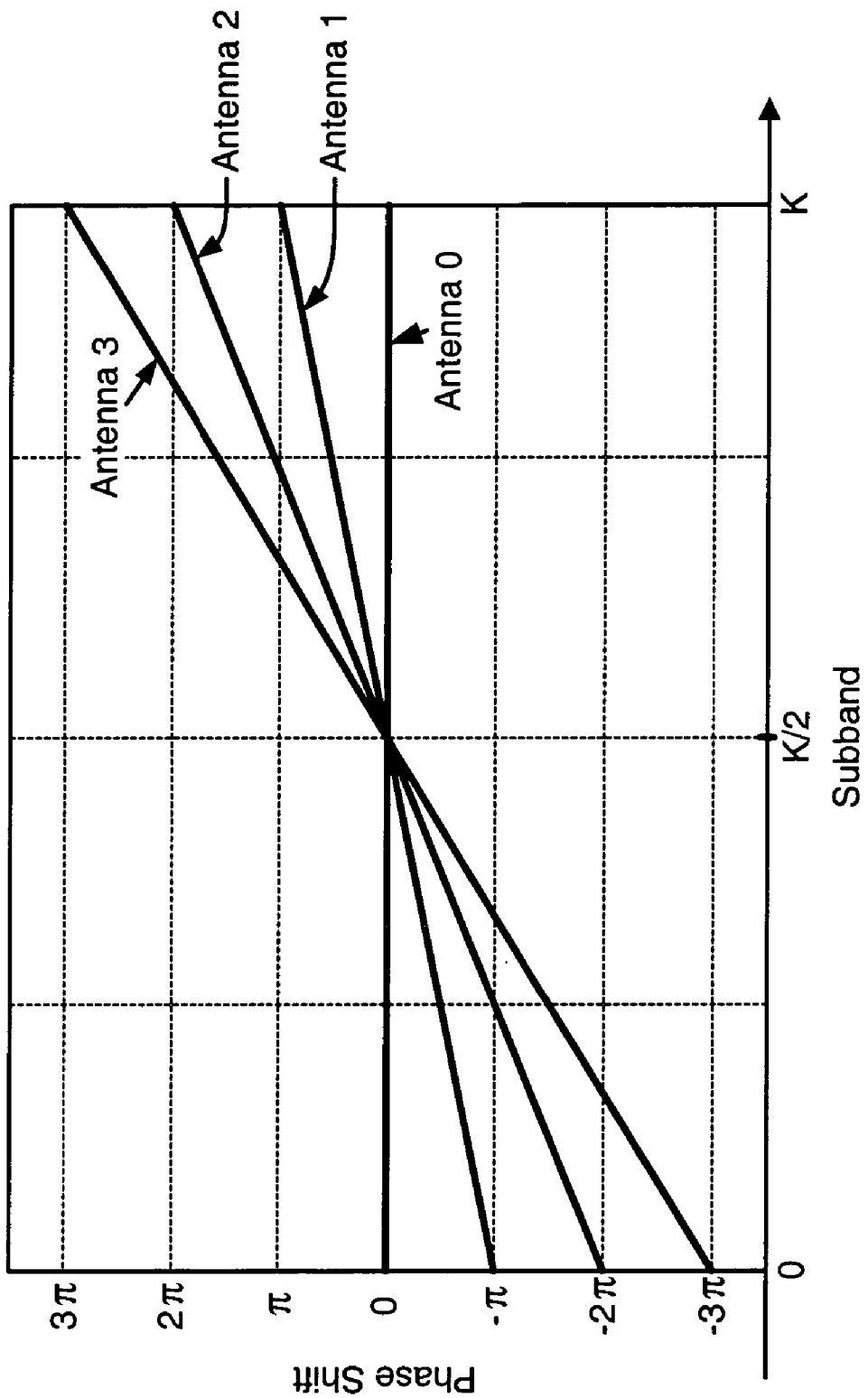
FIG. 7 shows plots of linear phase shifts across subbands for four antennas.

FIG. 7 shows plots of the phase shifts for each transmit antenna for a case with T=4. The center of the K subbands is typically considered to be at zero frequency, as shown in FIG. 3. The weights generated based on equation (7) may be interpreted as creating a linear phase shift across the K subbands. Each transmit antenna i, for $i=0, \ldots, T-1$, is associated with a phase slope of $2\pi \cdot i/K$. The phase shift for each subband k, for $k=0, \ldots, K-1$, for each transmit antenna i is given as $2\pi \cdot i \cdot (k-K/2)/K$. The use of $B(i)=e^{-j\pi \times i}$ result in subband $k=K/2$ observing a phase shift of zero.

The weights derived based on equation (7) may be viewed as a linear filter having a discrete frequency response of $G_i(k')$, which may be expressed as:

$$G_i(k') = v_i(k' + K/2) = e^{j2\pi \frac{i \cdot k'}{K}}, \quad \text{Eq (8)}$$

for $i=0, \ldots, T-1$ and $k'=(-K/2), \ldots, (K/2-1)$. The subband index k is for a subband numbering scheme that places the zero frequency at subband $N_{center}=K/2$, as shown in FIG. 3. The subband index k' is a shifted version of the subband index k by K/2, or k'=k-K/2. This results in subband zero being at zero frequency for the new subband numbering scheme with the index k'. $N_{center}$ may be equal to some other value instead of K/2 if the index k is defined in some other manner (e.g., $k=1, \ldots, K$) or if K is an odd number.

A discrete time-domain impulse response $g_i(n)$ for the linear filter may be obtained by performing a K-point IDFT on the discrete frequency response $G_i(k')$. The impulse response $g_i(n)$ may be expressed as:

$$\begin{aligned} g_i(n) &= \frac{1}{K} \cdot \sum_{k'=-K/2}^{K/2-1} G_i(k') \cdot e^{j2\pi \frac{n \cdot k'}{K}}, \\ &= \frac{1}{K} \cdot \sum_{k'=-K/2}^{K/2-1} e^{j2\pi \frac{i \cdot k'}{K}} \cdot e^{j2\pi \frac{n \cdot k'}{K}}, \\ &= \frac{1}{K} \cdot \sum_{k'=-K/2}^{K/2-1} e^{j2\pi \frac{k'}{K}(i+n)}, \\ &= \begin{cases} 1 & \text{for } n = -i \\ 0 & \text{otherwise} \end{cases} \end{aligned} \quad \text{Eq (9)}$$

where n is an index for sample period and has a range of $n=0, \ldots, K-1$. Equation (9) indicates that the impulse response $g_i(n)$ for transmit antenna i has a single unit-value tap at a delay of i sample periods and is zero at all other delays.

The spatial processing with the weights defined as shown in equation (7) may be performed by multiplying the K modulation symbols for each transmit antenna i with the K weights $v_i(0)$ through $v_i(K-1)$ for that antenna and then performing a K-point IDFT on the K weighted symbols. Equivalently, the spatial processing with these weights may be achieved by (1) performing a K-point IDFT on the K modulation symbols to obtain K time-domain samples, and (2) performing a circular convolution of the K time-domain samples with the impulse response $g_i(n)$, which has a single unit-value tap at a delay of i sample periods.

Figure 8A:
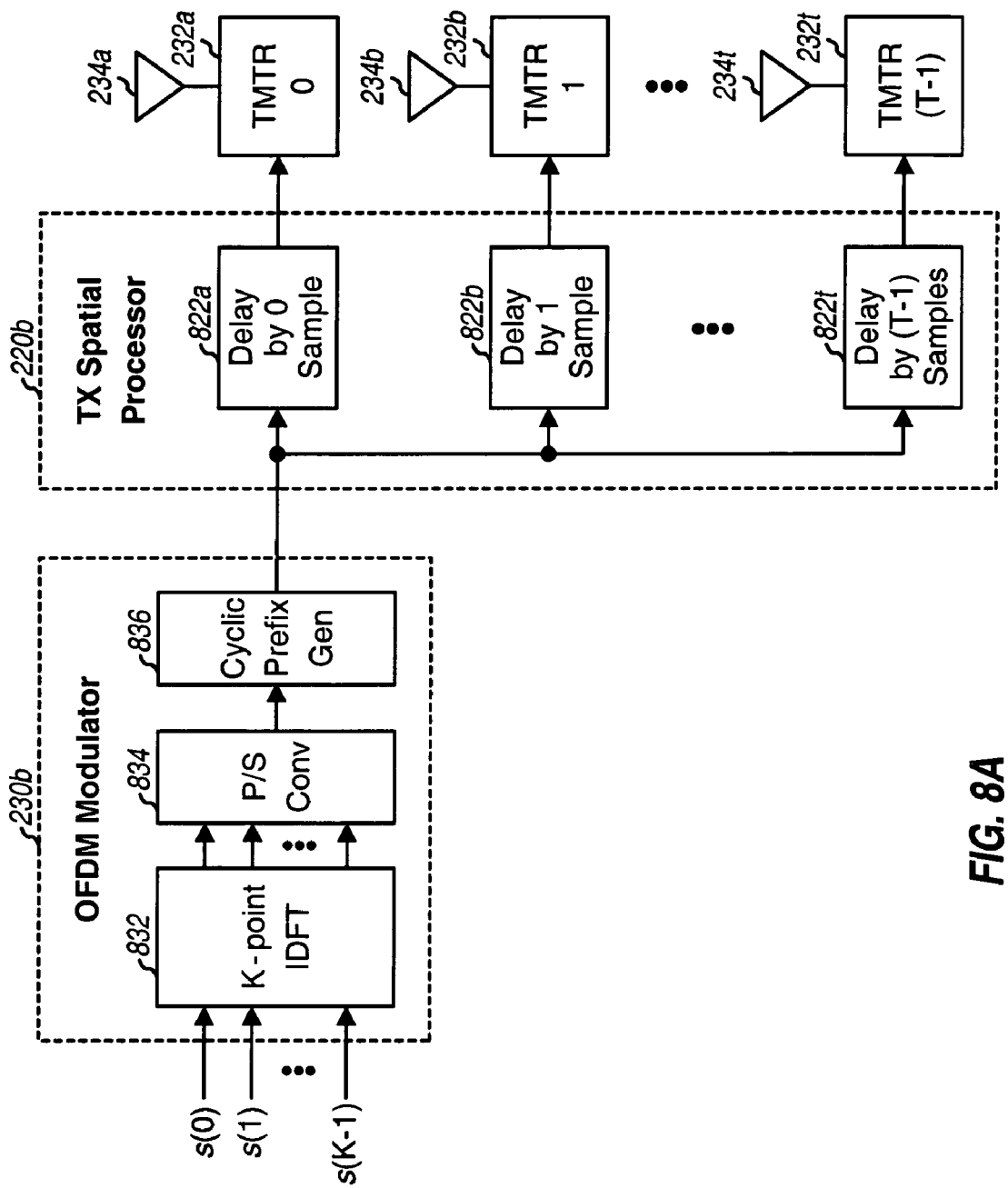
FIGS. 8A and 8B show two embodiments for achieving linear phase shifts using different delays for time-domain samples.

FIG. 8A shows a block diagram of a TX spatial processor 220b and an OFDM modulator 230b, which are another embodiment of TX spatial processor 220 and OFDM modulator 230, respectively, in FIG. 2. OFDM modulator 220b receives K modulation symbols s(0) through s(K−1) for the K subbands for each OFDM symbol period. Within OFDM modulator 230b, an IDFT unit 832 performs a K-point IDFT on the K modulation symbols and provides K time-domain samples. A P/S converter 834 serializes the K time-domain samples. A cyclic prefix generator 836 then appends a C-sample cyclic prefix and provides an OFDM symbol containing K+C samples to TX spatial processor 220b. TX spatial processor 220b includes T digital delay units 822a through 822t for the T transmit antennas. Each delay unit 822 receives and delays the OFDM symbol from OFDM demodulator 230b by a different amount determined by the associated transmit antenna. In particular, delay unit 822a for transmit antenna 234a delays the OFDM symbol by zero sample period, delay unit 822b for transmit antenna 234b delays the OFDM symbol by one sample period, and so on, and delay unit 822t for transmit antenna 234t delays the OFDM symbol by T−1 sample periods. The subsequent processing by transmitter units 232 is as described above.

Figure 8B:
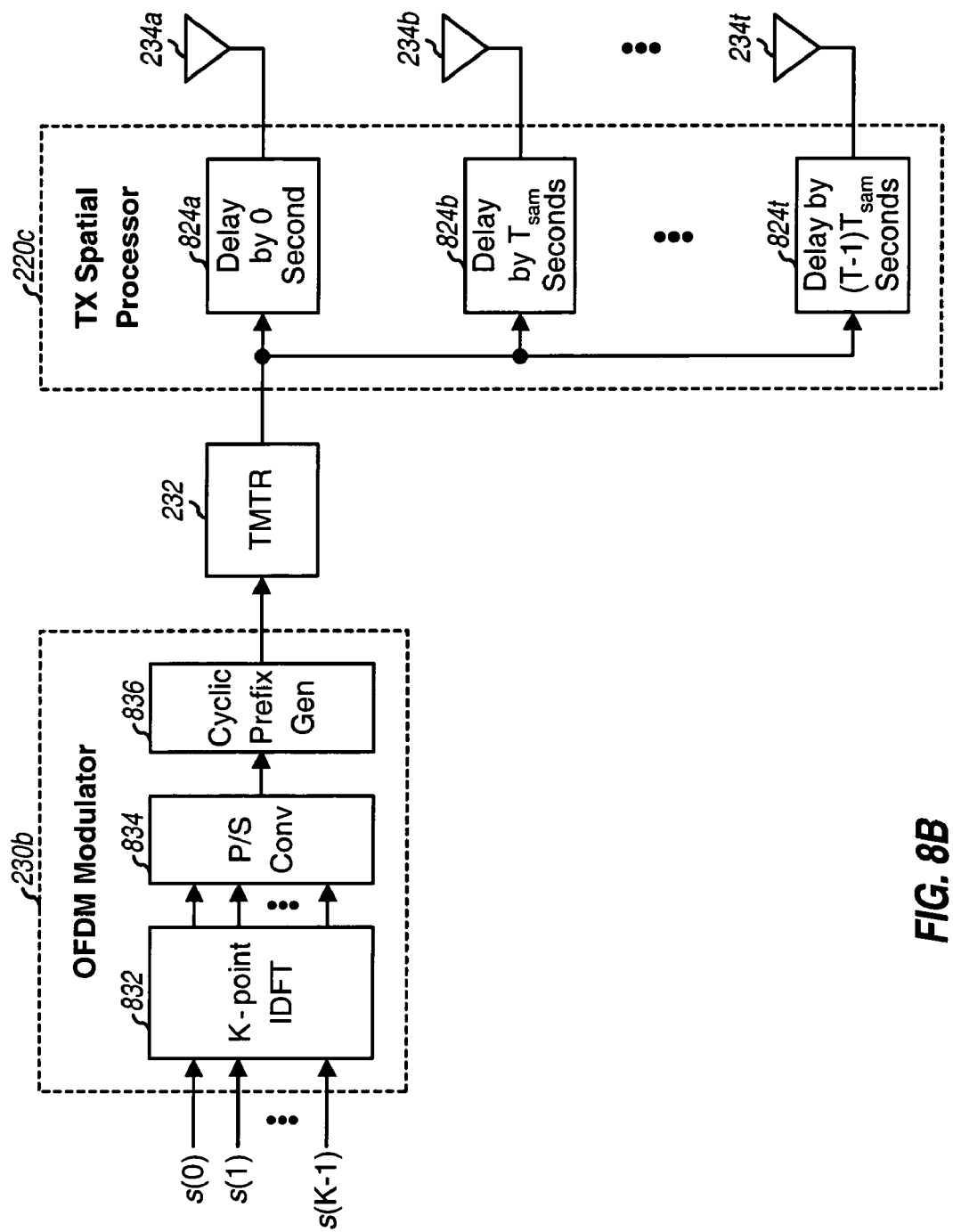

FIG. 8B shows a block diagram of OFDM modulator 230b and a TX spatial processor 220c, which is yet another embodiment of TX spatial processor 220 in FIG. 2. OFDM modulator 220b performs OFDM modulation on K modulation symbols for each OFDM symbol period as described above for FIG. 8A. Transmitter unit 232 then receives and conditions the OFDM symbol for each symbol period to generate a modulated signal. TX spatial processor 220c provides time delay in the analog domain. TX spatial processor 220c includes T analog delay units 824a through 824t for the T transmit antennas. Each delay unit 824 receives and delays the modulated signal by a different amount determined by the associated transmit antenna. In particular, delay unit 824a for the first transmit antenna 234a delays the modulated signal by zero seconds, delay unit 824b for the second transmit antenna 234b delays the modulated signal by one sample period (or $T_{sam}$ seconds), and so on, and delay unit 824t for the T-th transmit antenna 234t delays the modulated signal by (T−1) sample periods (or $(T-1) \cdot T_{sam}$ seconds). A sample period is equal to $T_{sam}=1/(BW \cdot (K+C))$, where BW is the overall bandwidth of the system in Hertz.

Figure 8C:
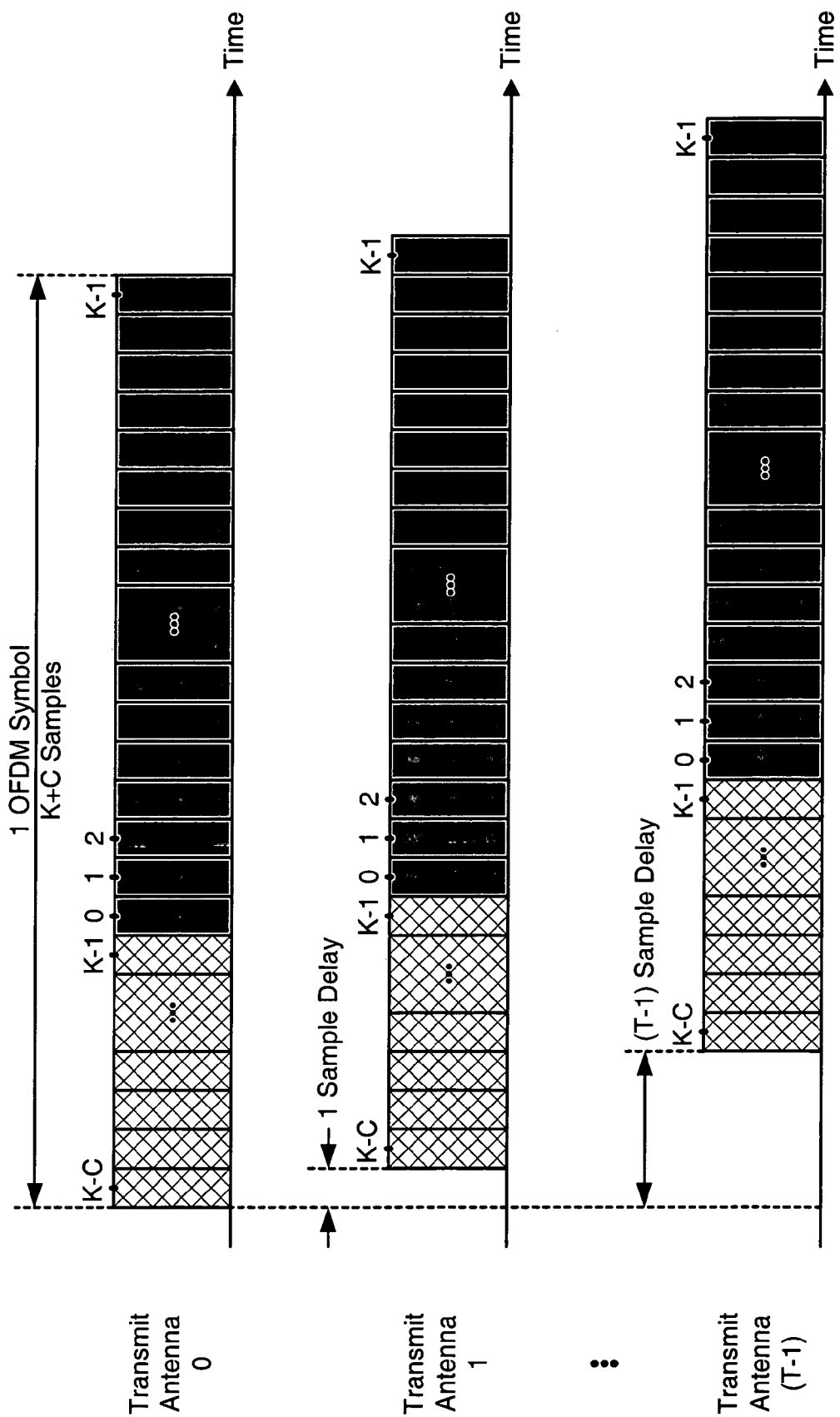
FIG. 8C shows transmissions from T transmit antennas for the embodiments shown in FIGS. 8A and 8B.

FIG. 8C shows a timing diagram for the T transmissions from the T transmit antennas for the embodiments shown in FIGS. 8A and 8B. The same OFDM symbol is transmitted from each of the T transmit antennas. However, the OFDM symbol sent from each transmit antenna is delayed by a different amount. The T delayed and non-delayed OFDM symbols for the T antennas may be viewed as T different versions of the same OFDM symbol.

For the embodiments shown in equations (7) through (9) and FIGS. 8A through 8C, the delays for the T transmit antennas are in integer numbers of sample periods. Phase slopes that result in non-integer delays for the T transmit antennas (or $$B(i) = e^{-j\pi \frac{i}{L}},$$

where L>1) may also be implemented. For example, the time-domain samples from OFDM modulator 230b in FIG. 8A may be up-sampled to a higher rate (e.g., with a period of $T_{upsam}=T_{sam}/L$), and the higher rate samples may be delayed by digital delay units 822 by integer numbers of the higher rate sample period ($T_{upsam}$). Alternatively, analog delay units 824 in FIG. 8B may provide delays in integer numbers of $T_{upsam}$ (instead of $T_{sam}$).

When the number of transmit antennas is less than the cyclic prefix length (or T<C), the cyclic prefix appended to each OFDM symbol makes a linear delay by digital delay units 822 or analog delay units 824 appears like a circular rotation for the circular convolution with the time-domain impulse response $g_i(n)$. The weights as defined in equation (7) may thus be implemented by a time delay of i sample periods for each transmit antenna i, as shown in FIGS. 8A through 8C. However, as shown in FIG. 8C, the OFDM symbol is transmitted from the T transmit antennas at different delays, which reduces the effectiveness of the cyclic prefix to protect against multipath delay.

The IDFT of K weighted symbols (which are obtained by multiplying K modulation symbols with the phase slope shown in equation (7)) provides a time-domain sample sequence that is equal to a circular shift of the K time-domain samples from the IDFT of the K (original unweighted) modulation symbols. The spatial processing may thus be performed by circularly shifting these K time-domain samples.

Figure 9A:
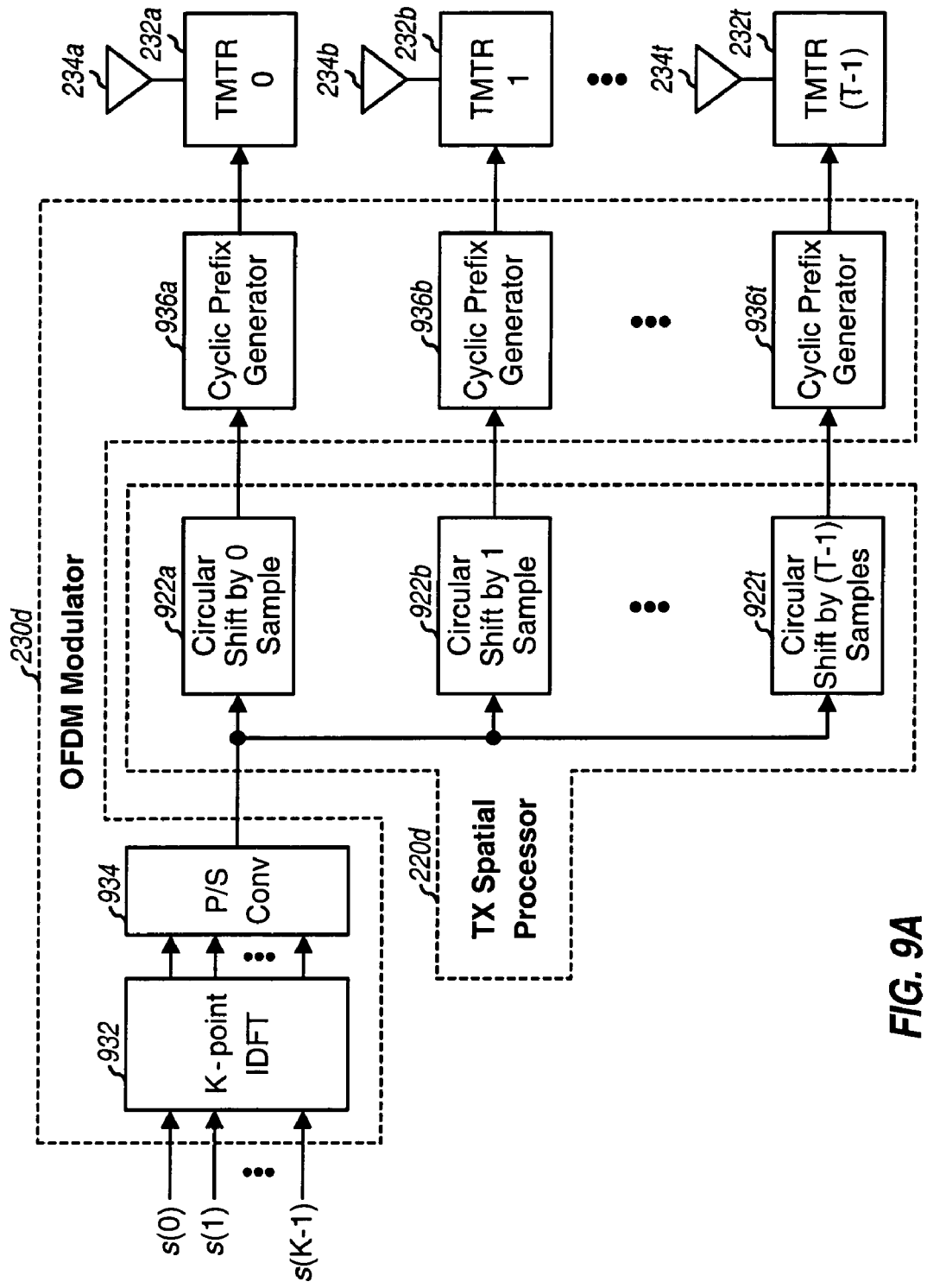
FIG. 9A shows an embodiment for achieving linear phase shifts using circular shifts for time-domain samples.

FIG. 9A shows a block diagram of an OFDM modulator 230d and a TX spatial processor 220d, which are yet another embodiment of OFDM modulator 230 and TX spatial processor 220, respectively, in FIG. 2. Within OFDM modulator 230d, an IDFT unit 932 performs a K-point IDFT on the K modulation symbols and provides K time-domain samples, and a P/S converter 934 serializes the K time-domain samples. TX spatial processor 220d includes T circular shift units 922a through 922t for the T transmit antennas. Each unit 922 receives the K time-domain samples from P/S converter 934, performs a circular shift of the K time-domain samples by i samples for transmit antenna i, and provides a circular-shifted transformed symbol containing K samples. In particular, unit 922a performs a circular shift by 0 sample for transmit antenna 234a, unit 922b performs a circular shift by 1 sample for transmit antenna 234b, and so on, and unit 922t performs a circular shift by (T−1) samples for transmit antenna 234t. T cyclic prefix generators 936a through 936t receive the circular-shifted transformed symbols from units 922a through 922t, respectively. Each cyclic prefix generator 936 appends a C-sample cyclic prefix to its circular-shifted transformed symbol and provides an OFDM symbol containing (K+C) samples. The subsequent processing by transmitter units 232a through 232t is as described above.

Figure 9B:
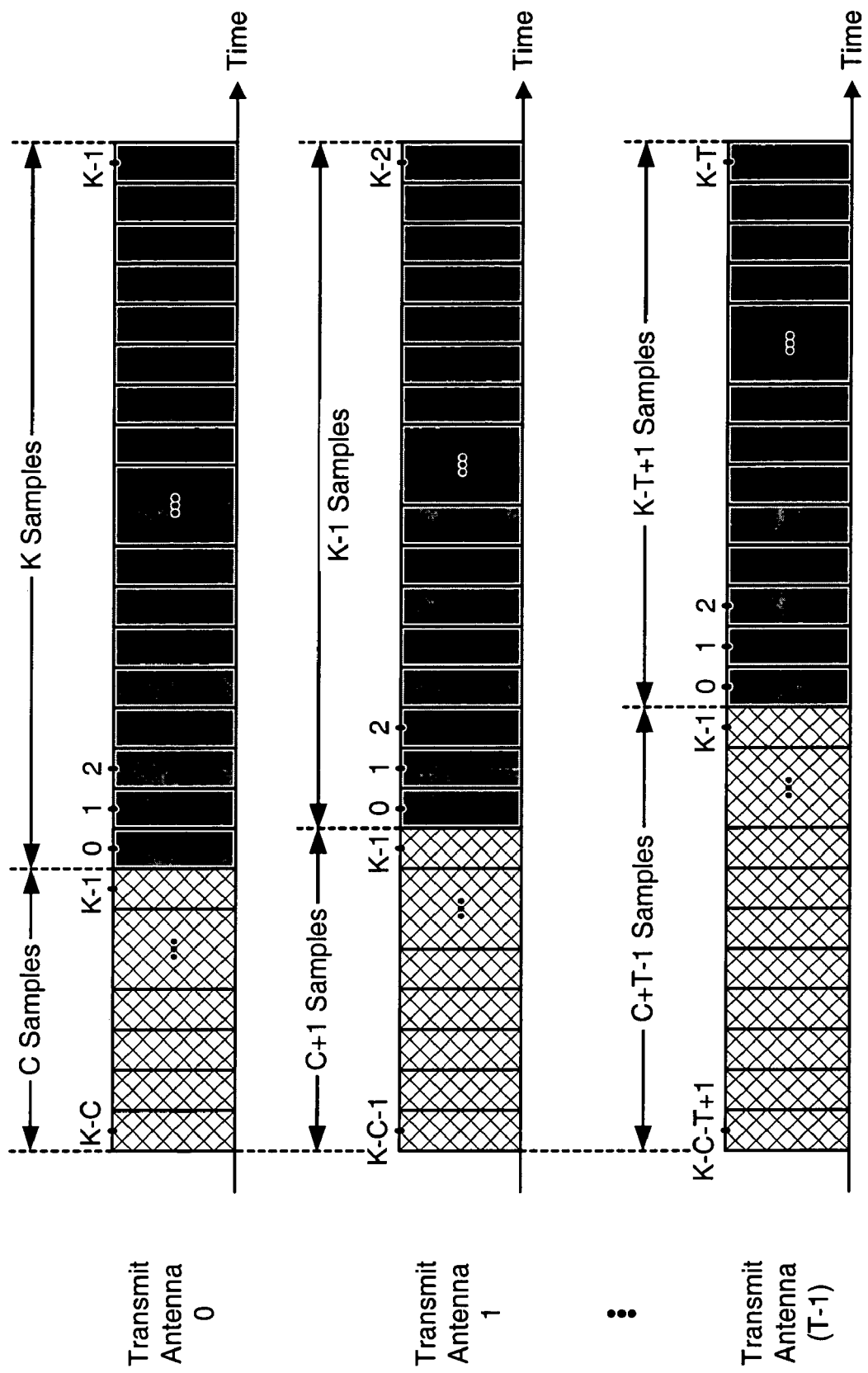
FIG. 9B shows transmissions from T transmit antennas for the embodiment shown in FIG. 9A.

FIG. 9B shows a timing diagram for the T transmissions from the T transmit antennas for the embodiment shown in FIG. 9A. A different version of the OFDM symbol is generated for each of the T transmit antennas by circularly shifting a different amount. However, the T different versions of the OFDM symbol are sent from the T transmit antennas at the same time.

The embodiments shown in FIGS. 8A, 8B, and 9A illustrate some of the ways in which spatial processing for steering diversity may be performed. In general, the spatial processing for steering diversity may be performed in various manners and at various locations within the transmitting entity. For example, the spatial processing may be performed in the time-domain or the frequency-domain, using digital circuitry or analog circuitry, prior to or after the OFDM modulation, and so on.

Equations (6) and (7) represent a function that provides linearly changing phase shifts across the K subbands for each transmit antenna. The application of linearly changing phase shifts to modulation symbols in the frequency domain may be achieved by either delaying or circularly shifting the corresponding time-domain samples, as described above. In general, the phase shifts across the K subbands for each transmit antenna may be changed in a continuous manner using any function so that the beams are varied in a continuous instead of abrupt manner across the subbands. A linear function of phase shifts is just one example of a continuous function. The continuous change ensures that the performance for single-antenna devices that rely on some amounts of correlation across the subbands (e.g., to simplify channel estimation) is not degraded.

In the description above, steering diversity is achieved for a transmission of one modulation symbol on each subband in each symbol period. Multiple (S) modulation symbols may also be sent via the T transmit antennas on one subband in one symbol period to a multi-antenna receiving entity with R receive antennas using steering diversity, where $S \leq \min\{T, R\}$ The steering diversity techniques described herein may be used for various wireless systems. These techniques may also be used for the downlink (or forward link) as well as the uplink (or reverse link). Steering diversity may be performed by any entity equipped with multiple antennas.

Steering diversity may be used in various manners. For example, a transmitting entity (e.g., an access point or a user terminal) may use steering diversity to transmit to a receiving entity (e.g., another access point or user terminal) when accurate information about the wireless channel is not available. Accurate channel information may not be available due to various reasons such as, for example, a feedback channel that is corrupted, a system that is poorly calibrated, the channel conditions changing too rapidly for the transmitting entity to use/adjust beam steering on time, and so on. The rapidly changing channel conditions may be due to, for example, the transmitting and/or receiving entity moving at a high velocity.

Steering diversity may also be used for various applications in a wireless system. In one application, broadcast channels in the system may be transmitted using steering diversity as described above. The use of steering diversity allows wireless devices in the system to possibly receive the broadcast channels with improved reliability, thereby increasing the range of the broadcast channels. In another application, a paging channel is transmitted using steering diversity. Again, improved reliability and greater coverage may be achieved for the paging channel via the use of steering diversity. In yet another application, an 802.11a access point uses steering diversity to improve the performance of user terminals under its coverage area.

The steering diversity techniques described herein may be implemented by various means. For example, these techniques may be implemented in hardware, software, or a combination thereof. For a hardware implementation, the processing units used to perform spatial processing for steering diversity may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the steering diversity techniques may be implemented with modules (e.g., procedures, functions, and so on) that perform the functions described herein. The software codes may be stored in a memory unit (e.g., memory unit 242 in FIG. 2) and executed by a processor (e.g., controller 240). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting data in a wireless communication system, comprising:
    performing an inverse discrete Fourier transform on a plurality of input symbols for a plurality of frequency subbands to obtain a plurality of time-domain samples, wherein each frequency subband is associated with a different steering vector of a plurality of steering vectors, and
    repeating a portion of the plurality of time-domain samples to obtain an input sequence of time-domain samples;
    delaying the input sequence of time-domain samples by different sample period amounts to generate a plurality of output sequences of time-domain samples for a plurality of antennas, wherein each different sample period amount is associated with a different steering vector of the plurality of steering vectors; and
    transmitting the plurality of output sequences from the plurality of antennas.

2. The method of claim 1, wherein the generating the plurality of output sequences of time-domain samples comprises:
    delaying the input sequence by different integer numbers of sample periods to generate the plurality of output sequences.

3. The method of claim 1, wherein the generating the plurality of output sequences of time-domain samples comprises:
    delaying the input sequence by different fractional amounts of a sample period to generate the plurality of output sequences.

4. The method of claim 1, wherein delaying the input sequence of time-domain samples by different sample period amounts comprises processing the time-domain samples to provide time delays corresponding to the different amounts in the analog domain prior to transmitting the plurality of output sequences from the plurality of antennas.

5. The method of claim 1, wherein the plurality of steering vectors are defined to vary beams in a continuous manner across the plurality of frequency subbands.

6. The method of claim 1, wherein the plurality of steering vectors are defined to change the different sample period amounts in a linear manner across the plurality of frequency subbands.

7. A method of transmitting data in a wireless communication system, comprising:
    performing an inverse discrete Fourier transform on a plurality of input symbols for a plurality of frequency subbands to obtain a plurality of time-domain samples, wherein each frequency subband is associated with a different steering vector of a plurality of steering vectors, and repeating a portion of the plurality of time-domain samples to obtain an input sequence of time-domain samples;

delaying the input sequence of time-domain samples by different amounts to generate a plurality of output sequences of time-domain samples for a plurality of antennas, wherein each different amount is associated with a different steering vector of the plurality of steering vectors; and transmitting the plurality of output sequences from the plurality of antennas starting at different times.

8. The method of claim 7, wherein the plurality of steering vectors are defined to vary beams in a continuous manner across the plurality of frequency subbands.

9. The method of claim 7, wherein the plurality of steering vectors are defined to change the different amounts in a linear manner across the plurality of frequency subbands.

10. An apparatus in a wireless communication system, comprising:
   a modulator to process data to obtain an input sequence of time-domain samples, wherein the modulator performs an inverse discrete Fourier transform on a plurality of input symbols for a plurality of frequency subbands to obtain a plurality of time-domain samples and further repeats a portion of the plurality of time-domain samples to obtain the input sequence of time-domain samples, wherein each frequency subband is associated with a different steering vector of a plurality of steering vectors;
   a processor to generate a plurality of output sequences of time-domain samples for a plurality of antennas by temporally modifying the input sequence of time-domain samples, wherein the processor delays the input sequence by different sample period amounts to generate the plurality of output sequences, wherein each different sample period amount is associated with a different steering vector of the plurality of steering vectors; and
   a plurality of transmitter units to transmit the plurality of output sequences from the plurality of antennas.

11. The apparatus of claim 10, wherein the processor comprises:
   a plurality of delay unit to delay the input sequence by different fractional amounts of a sample period to generate the plurality of output sequences.

12. The apparatus of claim 10, wherein the processor delays the input sequence by different amounts to generate the plurality of output sequences by providing time delays corresponding to the different sample period amounts in the analog domain.

13. The apparatus of claim 10, wherein the plurality of steering vectors are defined to vary beams in a continuous manner across the plurality of frequency subbands.

14. The apparatus of claim 10, wherein the plurality of steering vectors are defined to change the different sample period amounts in a linear manner across the plurality of frequency subbands.

15. An apparatus in a wireless communication system, comprising:
   means for processing data to obtain an input sequence of time-domain samples, wherein the means for processing the data comprises
      means for performing an inverse discrete Fourier transform on a plurality of input symbols for a plurality of frequency subbands to obtain a plurality of time-domain samples, wherein each frequency subband is associated with a different steering vector of a plurality of steering vectors;
      means for repeating a portion of the plurality of time-domain samples to obtain the input sequence of time-domain samples;
   means for generating a plurality of output sequences of time-domain samples for a plurality of antennas by temporally modifying the input sequence of time-domain samples, wherein the means for generating the plurality of output sequences of time-domain samples comprises:
      means for delaying the input sequence by different sample period amounts to generate the plurality of output sequences, wherein each different sample period amount is associated with a different steering vector of the plurality of steering vectors; and means for transmitting the plurality of output sequences from the plurality of antennas.

16. The apparatus of claim 15, wherein the means for delaying the input sequence by different amounts to generate the plurality of output sequences provides time delays corresponding to the different sample period amounts in the analog domain.

17. The apparatus of claim 15, wherein the plurality of steering vectors are defined to vary beams in a continuous manner across the plurality of frequency subbands.

18. The apparatus of claim 15, wherein the plurality of steering vectors are defined to change the different sample period amounts in a linear manner across the plurality of frequency subbands.

19. An apparatus in a wireless communication system, comprising:
   means for processing data to obtain an input sequence of time-domain samples, wherein the means for processing the data comprises
      means for performing an inverse discrete Fourier transform on a plurality of input symbols for a plurality of frequency subbands to obtain a plurality of time-domain samples, wherein each frequency subband is associated with a different steering vector of a plurality of steering vectors, and
      means for repeating a portion of the plurality of time-domain samples to obtain the input sequence of time-domain samples;
   means for generating a plurality of output sequences of time-domain samples for a plurality of antennas by temporally modifying the input sequence of time-domain samples, wherein the means for generating the plurality of output sequences of time-domain samples comprises:
      means for delaying the input sequence by different amounts to generate the plurality of output sequences, wherein each different amount is associated with a different steering vector of the plurality of steering vectors; and
   means for transmitting the plurality of output sequences from the plurality of antennas starting at different times.

20. The apparatus of claim 19, wherein the plurality of steering vectors are defined to vary beams in a continuous manner across the plurality of frequency subbands.

21. The apparatus of claim 19, wherein the plurality of steering vectors are defined to change the different sample period amounts in a linear manner across the plurality of frequency subbands.

22. A computer-program apparatus for processing data for transmission in a wireless communication system comprising a memory unit having instructions stored thereon, the instructions being executable by one or more processors and the instructions comprising:

instructions for processing data to obtain an input sequence of time-domain samples, wherein the computer-executable instructions for processing the data comprise:

instructions for performing an inverse discrete Fourier transform on a plurality of input symbols for a plurality of frequency subbands to obtain a plurality of time-domain samples, wherein each frequency subband is associated with a different steering vector of a plurality of steering vectors, and instructions for repeating a portion of the plurality of time-domain samples to obtain the input sequence of time-domain samples;

instructions for generating a plurality of output sequences of time-domain samples for a plurality of antennas by temporally modifying the input sequence of time-domain samples, wherein the computer-executable instructions for generating the plurality of output sequences of time-domain samples comprise instructions for delaying the input sequence by different sample period amounts to generate the plurality of output sequences, wherein each different sample period amount is associated with a different steering vector of the plurality of steering vectors; and instructions for transmitting the plurality of output sequences from the plurality of antennas.

23. The computer-program apparatus of claim 22, wherein the computer-executable instructions for generating the plurality of output sequences of time-domain samples comprise:

instructions for delaying the input sequence by different integer numbers of sample periods to generate the plurality of output sequences.

24. The computer-program apparatus of claim 22, wherein the computer-executable instructions for generating the plurality of output sequences of time-domain samples comprise:

instructions for delaying the input sequence by different fractional amounts of a sample period to generate the plurality of output sequences.

25. The computer-program apparatus of claim 22, wherein the instructions for delaying the input sequence by different amounts to generate the plurality of output sequences comprise instructions for providing time delays corresponding to the different sample period amounts in the analog domain.

26. The computer-program apparatus of claim 22, wherein the plurality of steering vectors are defined to vary beams in a continuous manner across the plurality of frequency subbands.

27. The computer-program apparatus of claim 22, wherein the plurality of steering vectors are defined to change the different sample period amounts in a linear manner across the plurality of frequency subbands.

28. A computer-program apparatus for processing data for transmission in a wireless communication system comprising a memory unit having instructions stored thereon, the instructions being executable by one or more processors and the instructions comprising:

instructions for processing data to obtain an input sequence of time-domain samples, wherein the computer-executable instructions for processing the data comprise:

instructions for performing an inverse discrete Fourier transform on a plurality of input symbols for a plurality of frequency subbands to obtain a plurality of time-domain samples, wherein each frequency subband is associated with a different steering vector of a plurality of steering vectors, and instructions for repeating a portion of the plurality of time-domain samples to obtain the input sequence of time-domain samples;

instructions for generating a plurality of output sequences of time-domain samples for a plurality of antennas by temporally modifying the input sequence of time-domain samples, wherein the computer-executable instructions for generating the plurality of output sequences of time-domain samples comprise instructions for delaying the input sequence by different amounts to generate the plurality of output sequences, wherein each different amount is associated with a different steering vector of the plurality of steering vectors; and instructions for transmitting the plurality of output sequences from the plurality of antennas starting at different times.

29. The computer-program apparatus of claim 28, wherein the plurality of steering vectors are defined to vary beams in a continuous manner across the plurality of frequency subbands.

30. The computer-program apparatus of claim 28, wherein the plurality of steering vectors are defined to change the different amounts in a linear manner across the plurality of frequency subbands.

\* \* \* \* \*